(12) United States Patent
Lu

(10) Patent No.: US 10,467,326 B1
(45) Date of Patent: Nov. 5, 2019

(54) DECREMENTAL SIMPLE LINEAR REGRESSION COEFFICIENT CALCULATION FOR BIG DATA OR STREAMED DATA USING COMPONENTS

(71) Applicant: Jizhu Lu, Redmond, WA (US)

(72) Inventor: Jizhu Lu, Redmond, WA (US)

(73) Assignee: CLOUD & STREAM GEARS LLC, Redmond, WA (US)

( * ) Notice: Subject to any disclaimer, the term of this patent is extended or adjusted under 35 U.S.C. 154(b) by 951 days.

(21) Appl. No.: 14/981,248

(22) Filed: Dec. 28, 2015

Related U.S. Application Data

(60) Provisional application No. 62/126,447, filed on Feb. 28, 2015.

(51) Int. Cl.
   *G06F 17/18* (2006.01)
   *G06Q 10/04* (2012.01)

(52) U.S. Cl.
   CPC ............ *G06F 17/18* (2013.01); *G06Q 10/04* (2013.01)

(58) Field of Classification Search
   None
   See application file for complete search history.

(56) References Cited

U.S. PATENT DOCUMENTS

| 7,747,413 | B2 | 6/2010 | Ramsey et al. |
| 7,840,377 | B2 | 11/2010 | Ramsey et al. |
| 9,069,726 | B2 | 6/2015 | Lu |
| 2007/0294216 | A1* | 12/2007 | Aggarwal ......... G06F 16/24568 |
| 2014/0164456 | A1 | 6/2014 | Lu |
| 2015/0324324 | A1* | 11/2015 | Liu .......................... G06F 17/18 703/2 |
| 2017/0177546 | A1* | 6/2017 | Heinz ............... G06F 16/24568 |
| 2017/0208081 | A1* | 7/2017 | Mukherjee .............. G06F 17/10 |

\* cited by examiner

*Primary Examiner* — James Trujillo
*Assistant Examiner* — Cheryl M Shechtman

(57) ABSTRACT

The present invention extends to methods, systems, and computing system program products for decrementally calculating simple linear regression coefficients for Big Data or streamed data. Embodiments of the invention include decrementally calculating one or more components of simple linear regression coefficients for a modified computation set based on the one or more components of simple linear regression coefficients calculated for a previous computation set and then calculating the simple linear regression coefficients for the modified computation set based on the decrementally calculated components. Decrementally calculating simple linear regression coefficients avoids visiting all data elements in the modified computation set and performing redundant computations thereby increasing calculation efficiency, saving computing resources and reducing computing system's power consumption.

18 Claims, 31 Drawing Sheets

The Definition of Simple Linear Regression Coefficients:

Suppose computation set $XY$ composes of $n$ pairs of data elements: $XY = \{(x_i, y_i) | i = 1, \ldots, n\}$, where data elements $x_1, x_2, x_3, x_4, \ldots\ldots, x_n$ are observed data from a predictor variable $X$ and data elements $y_1, y_2, y_3, y_4, \ldots\ldots, y_n$ are observed data from a response variable $Y$, simple linear regression coefficients for $XY$ need to be calculated.

Simple linear regression model is defined as $$Y = \beta 0 + \beta 1 X + \varepsilon$$

The relationship between Y and X can be described by a fitted regression line $\widehat{Y} = b0 + b1X$. The estimates $b1$ and $b0$ are called simple linear regression coefficients and can be calculated using following equations:

$$b1 = \frac{\sum_1^n (x_i - \bar{x}_k)(y_i - \bar{y}_k)}{\sum_1^n (x_i - \bar{x}_k)^2} \qquad 401$$

$$b0 = \bar{y}_k - b1\bar{x}_k \qquad 402$$

Define the sums of $X$ and $Y$ in the $k^{th}$ iteration respectively as below:

$$XS_k = x_1 + x_2 + x_3 + \cdots + x_n = \sum_1^n x_i \qquad 403$$

$$YS_k = y_1 + y_2 + y_3 + \cdots + y_n = \sum_1^n y_i \qquad 404$$

Define the means of the $X$ and $Y$ in the $k^{th}$ iteration respectively as below:

$$\bar{x}_k = \frac{(x_1 + x_2 + x_3 + \cdots + x_n)}{n} = \frac{\sum_1^n x_i}{n} \qquad 405$$

$$\bar{y}_k = \frac{(y_1 + y_2 + y_3 + \cdots + y_n)}{n} = \frac{\sum_1^n y_i}{n} \qquad 406$$

Fig. 4A

The simple linear regression coefficients of $XY$ in the $k^{th}$ iteration is defined as:

$$b1_k = \frac{\sum_1^n(x_i-\bar{x}_k)(y_i-\bar{y}_k)}{\sum_1^n(x_i-\bar{x}_k)^2} \qquad \sim\!\!\sim 407$$

$$b0_k = \bar{y}_k - b1_k\bar{x}_k \qquad \sim\!\!\sim 408$$

Suppose components $b1_k$ and $b0_k$ have already been calculated, the simple linear regression coefficients for the computation set need to be calculated again after an existing pair of data elements $(x_r, y_r)(0 \leq r \leq n)$ is removed from $XY$.

Define the sums and means of X variable and Y variable respectively in the modified $XY$ with size $n-1$ in the k+1$^{th}$ iteration as below:

$$XS_{k+1} = x_1 + x_2 + x_3 + \cdots + x_n - x_r = \sum_1^n x_i - x_r \qquad \sim\!\!\sim 409$$

$$YS_{k+1} = y_1 + y_2 + y_3 + \cdots + y_n - y_r = \sum_1^n y_i - y_r \qquad \sim\!\!\sim 410$$

$$\bar{x}_{k+1} = \frac{(x_1+x_2+x_3+\cdots+x_n-x_r)}{n-1} = \frac{\sum_1^n x_i - x_r}{n-1} \qquad \sim\!\!\sim 411$$

$$\bar{y}_{k+1} = \frac{(y_1+y_2+y_3+\cdots+y_n-y_r)}{n-1} = \frac{\sum_1^n y_i - y_r}{n-1} \qquad \sim\!\!\sim 412$$

The simple linear regression coefficients for the modified computation set $XY$ in the k+1$^{th}$ iteration is defined as:

$$b1_{k+1} = \frac{\sum_1^n(x_i-\bar{x}_{k+1})(y_i-\bar{y}_{k+1})-(x_r-\bar{x}_{k+1})(y_r-\bar{y}_{k+1})}{\sum_1^n(x_i-\bar{x}_{k+1})^2-(x_r-\bar{x}_{k+1})^2} \qquad \sim\!\!\sim 413$$

$$b0_{k+1} = \bar{y}_{k+1} - b1_{k+1}\bar{x}_{k+1} \qquad \sim\!\!\sim 414$$

Fig. 4A Cont'd

Some Example Components of Simple Linear Regression Coefficients:

- $XS_k = \sum_1^n x_i$
- $YS_k = \sum_1^n y_i$
- $\bar{x}_k = \frac{XS_k}{n} = \frac{1}{n}\sum_1^n x_i$
- $\bar{y}_k = \frac{YS_k}{n} = \frac{1}{n}\sum_1^n y_i$
- $XSS_k = \sum_1^n x_i^2$
- $XV_k = \sum_1^n x_i^2 - n\bar{x}_k^2 = XSS_k - \frac{XS_k^2}{n} = XSS_k - n\bar{x}_k^2$
- $SSDX_k = \sum_1^n (x_i - \frac{XS_k}{n})^2 = \sum_1^n (x_i - \bar{x}_k)^2$
- $SDXY_k = \sum_1^n (x_i - \bar{x}_k)(y_i - \bar{y}_k) = \sum_1^n (x_i - \frac{XS_k}{n})(y_i - \bar{y}_k) = \sum_1^n (x_i - \bar{x}_k)(y_i - \frac{YS_k}{n}) = \sum_1^n (x_i - \frac{XS_k}{n})(y_i - \frac{YS_k}{n})$
- $SXY_k = \sum_1^n x_i y_i$
- $x\sigma_k^2 = \frac{\sum_1^n x_i^2}{n} - \bar{x}_k^2 = \frac{\sum_1^n x_i^2}{n} - \left(\frac{XS_k}{n}\right)^2$
- $b1_k = \frac{\sum_1^n (x_i - \bar{x}_k)(y_i - \bar{y}_k)}{\sum_1^n (x_i - \bar{x}_k)^2} = \frac{\sum_1^n (x_i - \frac{XS_k}{n})(y_i - \bar{y}_k)}{\sum_1^n (x_i - \frac{XS_k}{n})^2} = \frac{\sum_1^n (x_i - \bar{x}_k)(y_i - \frac{YS_k}{n})}{\sum_1^n (x_i - \bar{x}_k)^2} = \frac{\sum_1^n (x_i - \frac{XS_k}{n})(y_i - \frac{YS_k}{n})}{\sum_1^n (x_i - \frac{XS_k}{n})^2}$
- $b0_k = \frac{YS_k}{n} - b1_k \frac{XS_k}{n} = \frac{YS_k}{n} - b1_k \bar{x}_k = \bar{y}_k - b1_k \frac{XS_k}{n} = \bar{y}_k - b1_k \bar{x}_k$ Basic Decremental Component Calculation Equations:

The sum and/or the mean of independent variable and the sum or mean of dependent variable in previous data set will be used by several examples of decremental algorithms described in the following sections, so the equations for decremental calculation of sum or mean are put here instead of in each decremental algorithms.

According to the definitions of $XS_{k+1}$, $YS_{k+1}$, $\bar{x}_{k+1}$ and $\bar{y}_{k+1}$, they can be calculated in an decremental way:

$XS_{k+1} = XS_k - x_r$     415

$YS_{k+1} = YS_k - y_r$     416

$\bar{x}_{k+1} = \frac{XS_{k+1}}{n-1} = \frac{(n\bar{x}_k - x_r)}{n-1}$     417

$\bar{y}_{k+1} = \frac{YS_{k+1}}{n-1} = \frac{(n\bar{y}_k - r)}{n-1}$     418

Fig. 4B

Decremental Algorithm 1:

Simple linear regression coefficients can be decrementally calculated based on the components $XS_{k+1}$ or $\bar{x}_{k+1}$ and $YS_{k+1}$ or $\bar{y}_{k+1}$ defined in Figure 4A and Figure 4B and the $SXY_{k+1}$, $XV_{k+1}$ defined below.

$XSS_k = \sum_1^n x_i^2$ ⌒﹏419

$XSS_{k+1} = \sum_1^n x_i^2 - x_r^2$ ⌒﹏420

$XSS_{k+1}$ can be calculated in a decremental way:

$XSS_{k+1} = XSS_k - x_r^2$ ⌒﹏421

$XV_k = XSS_k - \frac{XS_k^2}{n} = XSS_k - n\bar{x}_k^2$ ⌒﹏422

$XV_{k+1} = XSS_{k+1} - \frac{XS_{k+1}^2}{n-1} = XSS_{k+1} - (n-1)\bar{x}_{k+1}^2$ ⌒﹏423

$SXY_k = \sum_1^n x_i y_i$ ⌒﹏424

$SXY_{k+1} = \sum_1^n x_i y_i - x_r y_r$ ⌒﹏425

$SXY_{k+1}$ can be calculated in a decremental way:

$SXY_{k+1} = SXY_k - x_r y_r$ ⌒﹏426

Once $XS_{k+1}$ or $\bar{x}_{k+1}$, $YS_{k+1}$ or $\bar{y}_{k+1}$, $SXY_{k+1}$, and $XV_{k+1}$ are calculated, then simple linear regression coefficients defined in equations 413 and 414 can be calculated by $$b1_{k+1} = \frac{(SXY_{k+1} - YS_{k+1}\bar{x}_{k+1})}{XV_{k+1}} = \frac{(SXY_{k+1} - \bar{y}_{k+1}XS_{k+1})}{XV_{k+1}} = \frac{(SXY_{k+1} - YS_{k+1}XS_{k+1}/(n-1))}{XV_{k+1}} = \frac{(SXY_{k+1} - (n-1)\bar{y}_{k+1}\bar{x}_{k+1})}{XV_{k+1}}$$

⌒﹏427

$$b0_{k+1} = \frac{YS_{k+1}}{n-1} - b1_{k+1}\frac{XS_{k+1}}{n-1} = \frac{YS_{k+1}}{n-1} - b1_{k+1}\bar{x}_{k+1} = \frac{YS_{k+1}}{n-1} - b1_{k+1}\bar{x}_{k+1} = \bar{y}_{k+1} - b1_{k+1}\bar{x}_{k+1}$$

Decremental Algorithm 2:

$SSDX_k = \sum_1^n (x_i - \bar{x}_k)^2$ 　　429

$SSDX_{k+1} = \sum_1^n (x_i - \bar{x}_{k+1})^2 - (x_r - \bar{x}_{k+1})^2$ 　　430

$SSDX_{k+1}$ can be calculated in a decremental way using $XS_k$ or $\bar{x}_k$ and $XS_{k+1}$ or $\bar{x}_{k+1}$:

$SSDX_{k+1} = SSDX_k - (x_r - XS_{k+1}/(n-1))(x_r - XS_k/n) = SSDX_k - (x_r - \bar{x}_{k+1})(x_r - \bar{x}_k)$

431

$SDXY_k = \sum_1^n (x_i - \bar{x}_k)(y_i - \bar{y}_k)$ 　　432

$SDXY_{k+1} = \sum_1^n (x_i - \bar{x}_{k+1})(y_i - \bar{y}_{k+1}) - (x_r - \bar{x}_{k+1})(y_r - \bar{y}_{k+1})$ 　　433

$SDXY_{k+1}$ can be calculated in a decremental way using $XS_{k+1}$ or $\bar{x}_{k+1}$ and $YS_{k+1}$ or $\bar{y}_{k+1}$:

$SDXY_{k+1} = SDXY_k - \frac{((n-1)x_r - XS_{k+1})(y_r - \bar{y}_{k+1})}{n} = SDXY_k - \frac{(x_r - \bar{x}_{k+1})((n-1)y_r - YS_{k+1})}{n} = SDXY_k - \frac{(n-1)(x_r - \bar{x}_{k+1})(y_r - \bar{y}_{k+1})}{n}$ 　　434

Once $SSDX_{k+1}$ and $SDXY_{k+1}$ are calculated, then simple linear regression coefficients defined in equations 413 and 414 can be calculated by $b1_{k+1} = \frac{SDXY_{k+1}}{SSDX_{k+1}}$ 　　435

$b0_{k+1} = \frac{YS_{k+1}}{n-1} - b1_{k+1}\frac{XS_{k+1}}{n-1} = \frac{YS_{k+1}}{n-1} - b1_{k+1}\bar{x}_{k+1} = \frac{YS_{k+1}}{n-1} - b1_{k+1}\bar{x}_{k+1} = \bar{y}_{k+1} - b1_{k+1}\bar{x}_{k+1}$

Decremental Algorithm 3:

Simple linear regression coefficients can be calculated based on components $XS_{k+1}$ or $\bar{x}_{k+1}$ and $YS_{k+1}$ or $\bar{y}_{k+1}$ defined in Figure 4A and Figure 4B and $XSS_{k+1}$, $SXY_{k+1}$ defined below.

$XSS_k = \sum_1^n x_i^2$ ⌢⌣437

$XSS_{k+1} = \sum_1^n x_i^2 - x_r^2$ ⌢⌣438

$XSS_{k+1}$ can be calculated in a decremental way:

$XSS_{k+1} = XSS_k - x_r^2$ ⌢⌣439

$SXY_k = \sum_1^n x_i y_i$ ⌢⌣440

$SXY_{k+1} = \sum_1^n x_i y_i - x_r y_r$ ⌢⌣441

$SXY_{k+1}$ can be calculated in a decremental way:

$SXY_{k+1} = SXY_k - x_r y_r$ ⌢⌣442

Once components $XS_{k+1}$ or $\bar{x}_{k+1}$, $YS_{k+1}$ or $\bar{y}_{k+1}$, $XSS_{k+1}$, and $SXY_{k+1}$ are calculated, then simple linear regression coefficients defined in equations 413 and 414 can be calculated by $$b1_{k+1} = \frac{SXY_{k+1} - XS_{k+1}\bar{y}_{k+1}}{XSS_{k+1} - XS_{k+1}^2/(n-1)} = \frac{SXY_{k+1} - \bar{x}_{k+1}YS_{k+1}}{XSS_{k+1} - (n-1)\bar{x}_{k+1}^2} = \frac{(n-1)SXY_{k+1} - XS_{k+1}YS_{k+1}}{(n-1)XSS_{k+1} - XS_{k+1}^2} = \frac{SXY_{k+1} - (n-1)\bar{x}_{k+1}\bar{y}_{k+1}}{XSS_{k+1} - (n-1)\bar{x}_{k+1}^2}$$

⌢⌣443

$$b0_{k+1} = \frac{YS_{k+1}}{n-1} - b1_{k+1}\frac{XS_{k+1}}{n-1} = \frac{YS_{k+1}}{n-1} - b1_{k+1}\bar{x}_{k+1} = \frac{YS_{k+1}}{n-1} - b1_{k+1}\bar{x}_{k+1} = \bar{y}_{k+1} - b1_{k+1}\bar{x}_{k+1}$$

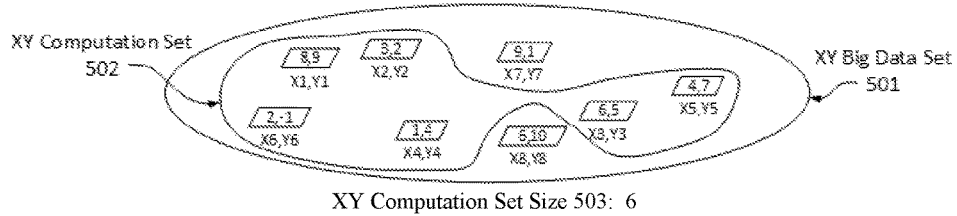

XY Computation Set Size 503: 6

Calculate Simple Linear Regression Coefficients for XY Computation Set 502

Traditional Algorithm:

1. Use equation 405 to calculate $\bar{x}_1$ and equation 406 to calculate $\bar{y}_1$ for the 1st iteration:

$$\bar{x}_1 = \frac{\sum_1^6 x_i}{6} = \frac{8+3+6+1+4+2}{6} = 4 \qquad \bar{y}_1 = \frac{\sum_1^6 y_i}{6} = \frac{9+2+5+4+7+(-1)}{6} = 4.3333333333333333$$

Operations in the two steps: 2 divisions, 10 additions

2. Calculate $\sum_1^6 (x_i - \bar{x}_1)(y_i - \bar{y}_1)$ for the 1st iteration:

$\sum_1^6 (x_i - \bar{x}_1)(y_i - \bar{y}_1) = (8 - 4)(9 - 4.3333333333333333) + (3 - 4)(2 - 4.3333333333333333) + (6 - 4)(5 - 4.3333333333333333) + (1 - 4)(4 - 4.3333333333333333) + (4 - 4)(7 - 4.3333333333333333) + (2 - 4)(-1 - 4.3333333333333333) = 34$ Operations in this step: 6 multiplications, 5 additions, 12 subtractions 3. Calculate $\sum_1^6 (x_i - \bar{x}_1)^2$ for the 1st iteration:

$\sum_1^6 (x_i - \bar{x}_1)^2 = (8 - 4)^2 + (3 - 4)^2 + (6 - 4)^2 + (1 - 4)^2 + (4 - 4)^2 + (2 - 4)^2 = 34$ Operations in this step: 6 multiplications, 5 additions, 6 subtractions 4. Use equations 407 and 408 to calculate $b1_1$ and $b0_1$ respectively for the 1st iteration:

$$b1_1 = \frac{\sum_1^6 (x_i - \bar{x}_1)(y_i - \bar{y}_1)}{\sum_1^6 (x_i - \bar{x}_1)^2} = \frac{34}{34} = 1.0$$

$b0_1 = \bar{y}_1 - b1_1 \bar{x}_1 = 4.3333333333333333 - 1.0 \times 4 = 4.3333333333333333 - 4.0 = 0.3333333333333333$ Operations in this step: 1 division, 1 multiplication, 1 subtraction There are a total of 3 divisions, 13 multiplications, 20 additions and 19 subtractions.

Fig. 5A

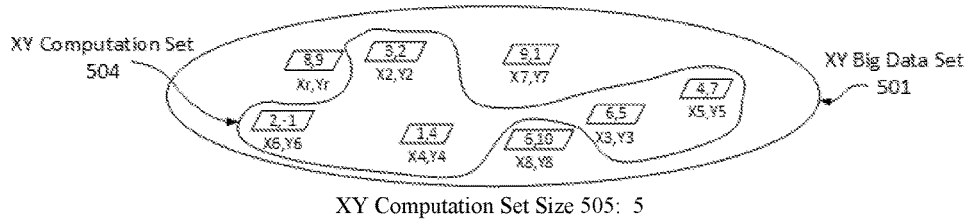

XY Computation Set Size 505: 5

Calculate Simple Linear Regression Coefficients for XY Computation Set 504

Traditional Algorithm:

1. Calculate the $\bar{x}_2$ and $\bar{y}_2$ for the 2$^{nd}$ iteration:

$$\bar{x}_2 = \frac{3+6+1+4+2}{5} = \frac{16}{5} = 3.2 \qquad \bar{y}_2 = \frac{2+5+4+7+(-1)}{5} = \frac{17}{5} = 3.4$$

Operations in the two steps: 2 divisions, 8 additions

2. Calculate $\sum_2^6 (x_i - \bar{x}_2)(y_i - \bar{y}_2)$ for the 2$^{nd}$ iteration:

$\sum_2^6 (x_i - \bar{x}_2)(y_i - \bar{y}_2) = (3 - 3.2)(2 - 3.4) + (6 - 3.2)(5 - 3.4) + (1 - 3.2)(4 - 3.4) + (4 - 3.2)(7 - 3.4) + (2 - 3.2)(-1 - 3.4) = 11.6$ Operations in this step: 5 multiplications, 4 additions, 10 subtractions 3. Calculate $\sum_2^6 (x_i - \bar{x}_2)^2$ for the 2$^{nd}$ iteration:

$\sum_2^6 (x_i - \bar{x}_2)^2 = (3 - 3.2)^2 + (6 - 3.2)^2 + (1 - 3.2)^2 + (4 - 3.2)^2 + (2 - 3.2)^2 = 14.8$ Operations in this step: 5 multiplications, 4 additions, 5 subtractions 4. Use equations 407 and 408 to calculate $b1_2$ and $b0_2$ respectively for the 2$^{nd}$ iteration:

$$b1_2 = \frac{\sum_2^6 (x_i - \bar{x}_2)(y_i - \bar{y}_2)}{\sum_2^6 (x_i - \bar{x}_2)^2} = \frac{11.6}{14.8} = 0.7837837837837838$$

$b0_2 = \bar{y}_2 - b1_2 \bar{x}_2 = 3.4 - 0.7837837837837838 \times 3.2 = 3.4 - 2.50810810810810816 = 0.89189189189189184$ Operations in this step: 1 division, 1 multiplication, 1 subtraction There are a total of 3 divisions, 11 multiplications, 16 additions and 16 subtractions.

Fig. 5A Cont'd 1

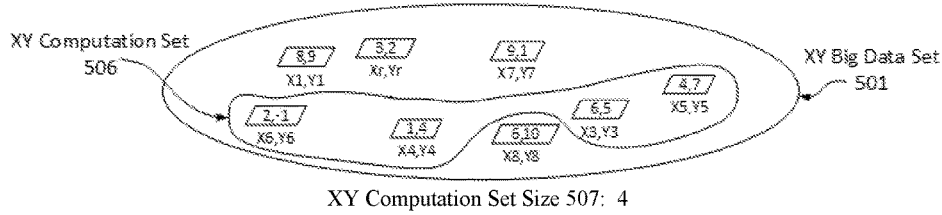

XY Computation Set Size 507: 4

Calculate Simple Linear Regression Coefficients for XY Computation Set 506

Traditional Algorithm:

1. Calculate the $\bar{x}_3$ and $\bar{y}_3$ for the 3$^{rd}$ iteration:

$$\bar{x}_3 = \frac{6+1+4+2}{4} = \frac{13}{4} = 3.25 \qquad \bar{y}_3 = \frac{5+4+7+(-1)}{4} = \frac{15}{4} = 3.75$$

Operations in the two steps: 2 divisions, 6 additions

2. Calculate $\sum_3^6 (x_i - \bar{x}_3)(y_i - \bar{y}_3)$ for the 3$^{rd}$ iteration:

$$\sum_3^6 (x_i - \bar{x}_3)(y_i - \bar{y}_3) = (6 - 3.25)(5 - 3.75) + (1 - 3.25)(4 - 3.75) + (4 - 3.25)(7 - 3.75) + (2 - 3.25)(-1 - 3.75) = 11.25$$

Operations in this step: 4 multiplications, 3 additions, 8 subtractions

3. Calculate $\sum_3^6 (x_i - \bar{x}_3)^2$ for the 3$^{rd}$ iteration:

$$\sum_3^6 (x_i - \bar{x}_3)^2 = (6 - 3.25)^2 + (1 - 3.25)^2 + (4 - 3.25)^2 + (2 - 3.25)^2 = 14.75$$

Operations in this step: 4 multiplications, 3 additions, 4 subtractions

4. Use equations 407 and 408 to calculate $b1_3$ and $b0_3$ respectively for the 3$^{rd}$ iteration:

$$b1_3 = \frac{\sum_3^6 (x_i - \bar{x}_3)(y_i - \bar{y}_3)}{\sum_3^6 (x_i - \bar{x}_3)^2} = \frac{11.25}{14.75} = 0.7627118644067797$$

$$b0_3 = \bar{y}_3 - b1_3 \bar{x}_3 = 3.75 - 0.7627118644067797 \times 3.25 = 1.271186440677965975$$

Operations in this step: 1 division, 1 multiplication, 1 subtraction

There are a total of 3 divisions, 9 multiplications, 12 additions and 13 subtractions.

Traditional algorithms typically take 3 divisions, $2n+1$ multiplications, $4(n-1)$ additions, and $3n+1$ subtractions when calculating simple linear regression coefficients for a computation set composed of $n$ pairs of data elements without optimization.

Fig. 5A Cont'd 2

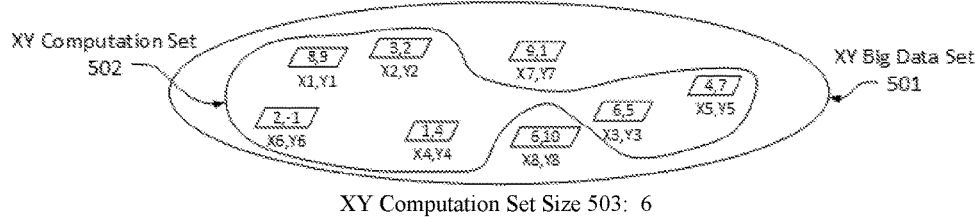

XY Computation Set Size 503: 6

Calculate Simple Linear Regression Coefficients for XY Computation Set 502

Decremental Algorithm 1:

1. Use equation 405 to calculate $\bar{x}_1$ and equation 406 to calculate $\bar{y}_1$ for the 1st iteration:

$$\bar{x}_1 = \frac{\sum_1^n x_i}{n} = \frac{8+3+6+1+4+2}{6} = \frac{24}{6} = 4$$

$$\bar{y}_1 = \frac{\sum_1^n y_i}{n} = \frac{9+2+5+4+7+(-1)}{6} = \frac{26}{6} = 4.3333333333333333$$

Operations in the two steps: 2 divisions, 10 additions

2. Use equation 419 to calculate $XSS_1$ and equation 422 to calculate $XV_1$ for the 1st iteration:

$$XSS_1 = \sum_1^n x_i^2 = 8^2 + 3^2 + 6^2 + 1^2 + 4^2 + 2^2 = 130$$

$$XV_1 = XSS_1 - 6\bar{x}_1^2 = 130 - 6 \times 4^2 = 130 - 96 = 34$$

Operations in this step: 8 multiplications, 5 additions, 1 subtraction

3. Use equation 424 to calculate $SXY_1$ for the 1st iteration:

$$SXY_1 = \sum_1^6 x_i y_i = 8 \times 9 + 3 \times 2 + 6 \times 5 + 1 \times 4 + 4 \times 7 + 2 \times (-1) = 138$$

Operations in this step: 6 multiplications, 5 additions

4. Calculate the simple linear regression coefficients $b1_1$ and $b0_1$ for the 1st iteration:

$$b1_1 = \frac{SXY_1 - 6\bar{x}_1\bar{y}_1}{XV_1} = \frac{138 - 6 \times 4 \times 4.3333333333333333}{34} = \frac{34}{34} = 1.0$$

$$b0_1 = \bar{y}_1 - b1_1\bar{x}_1 = 4.3333333333333333 - 1.0 \times 4 = 0.3333333333333333$$

Operations in this step: 1 division, 3 multiplications, 2 subtractions

There are a total of 3 divisions, 17 multiplications, 20 additions and 3 subtractions.

Fig. 5B

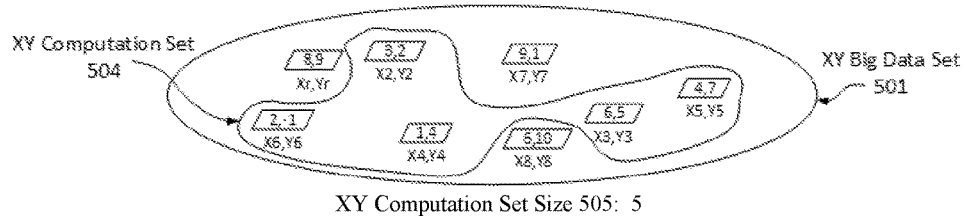

XY Computation Set Size 505: 5

Calculate Simple Linear Regression Coefficients for XY Computation Set 504

Decremental Algorithm 1:

1. Calculate 6-1 and keep its value for future calculation. Operations in this step: 1 subtraction.
2. Use equation 417 to calculate $\bar{x}_2$ and equation 418 to calculate $\bar{y}_2$ for the 2$^{nd}$ iteration:

$$\bar{x}_2 = \frac{6\bar{x}_1 - x_r}{6-1} = \frac{6 \times 4 - 8}{5} = \frac{16}{5} = 3.2, \qquad \bar{y}_2 = \frac{6\bar{y}_1 - y_r}{6-1} = \frac{6 \times 4.3333333333333333 - 9}{5} = \frac{17}{5} = 3.4$$

Operations in the two steps: 2 divisions, 2 multiplications, 2 subtractions

3. Use equation 421 to calculate $XSS_2$ and equation 423 to calculate $XV_2$ for the 2$^{nd}$ iteration:

$$XSS_2 = XSS_1 - x_r^2 = 130 - 8^2 = 130 - 64 = 66$$

$$XV_2 = XSS_2 - (6-1)\bar{x}_2^2 = 66 - 5 \times 3.2^2 = 66 - 51.2 = 14.8$$

Operations in the two steps: 3 multiplications, 2 subtractions

4. Use equation 426 to calculate $SXY_2$ for the 2$^{nd}$ iteration:

$$SXY_2 = SXY_1 - x_r y_r = 138 - 8 \times 9 = 66$$

Operations in this step: 1 multiplication, 1 subtraction

5. Use equations 427 and 428 to calculate $b1_2$ and $b0_2$ respectively for the 2$^{nd}$ iteration:

$$b1_2 = \frac{SXY_2 - (6-1)\bar{x}_2 \bar{y}_2}{XV_2} = \frac{66 - 5 \times 3.2 \times 3.4}{14.8} = \frac{66 - 54.4}{14.8} = \frac{11.6}{14.8} = 0.7837837837837838$$

$$b0_2 = \bar{y}_2 - b1_2 \bar{x}_2 = 3.4 - 0.7837837837837838 \times 3.2 = 3.4 - 2.50810810810810816 = 0.89189189189189184$$

Operations in this step: 1 division, 3 multiplications, 2 subtractions

There are a total of 3 divisions, 9 multiplications and 8 subtractions.

Fig. 5B Cont'd 1

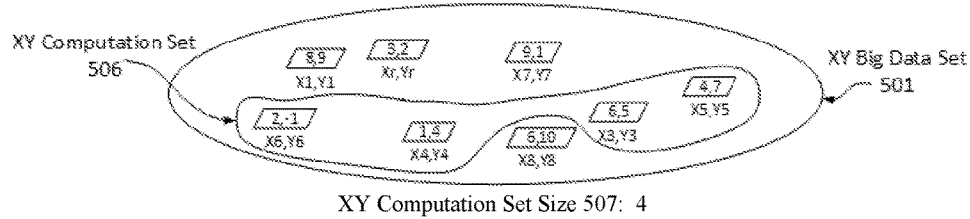

XY Computation Set Size 507: 4

Calculate Simple Linear Regression Coefficients for XY Computation Set 506

Decremental Algorithm 1:

1. Calculate 5-1 and keep its value for future calculation. Operations in this step: 1 subtraction.
2. Use equation 417 to calculate $\bar{x}_3$ and equation 418 to calculate $\bar{y}_3$ for the 3$^{rd}$ iteration:

$$\bar{x}_3 = \frac{(5\bar{x}_2 - x_r)}{5-1} = \frac{(5 \times 3.2 - 3)}{4} = \frac{13}{4} = 3.25 \qquad \bar{y}_3 = \frac{(5\bar{y}_2 - y_r)}{5-1} = \frac{(5 \times 3.4 - 2)}{4} = \frac{15}{4} = 3.75$$

Operations in the two steps: 2 divisions, 2 multiplications, 2 subtractions

3. Use equation 419 to calculate $XSS_3$ and equation 419 to calculate $XV_3$ for the 3$^{rd}$ iteration:

$$XSS_3 = XSS_2 - x_r^2 = 66 - 3^2 = 66 - 9 = 57$$

$$XV_3 = XSS_3 - (5-1)\bar{x}_3^2 = 57 - 4 \times 3.25^2 = 57 - 42.25 = 14.75$$

Operations in the two steps: 3 multiplications, 2 subtractions

4. Use equation 427 to calculate $SXY_3$ for the 3$^{rd}$ iteration:

$$SXY_3 = SXY_2 - x_r y_r = 66 - 3 \times 2 = 60$$

Operations in this step: 1 multiplication, 1 subtraction

5. Use equations 427 and 428 to $b1_3$ and $b0_3$ respectively for the 3$^{rd}$ iteration:

$$b1_3 = \frac{SXY_3 - (5-1)\bar{x}_3\bar{y}_3}{XV_3} = \frac{60 - 4 \times 3.25 \times 3.75}{14.75} = \frac{60 - 48.75}{14.75} = \frac{11.25}{14.75} = 0.7627118644067797$$

$$b0_3 = \bar{y}_3 - b1_3\bar{x}_3 = 3.75 - 0.7627118644067797 \times 3.25 = 1.271186440677965975$$

Operations in this step: 1 division, 3 multiplications, 2 subtractions

There are a total of 3 divisions, 9 multiplications and 8 subtractions.

Fig. 5B Cont'd 2

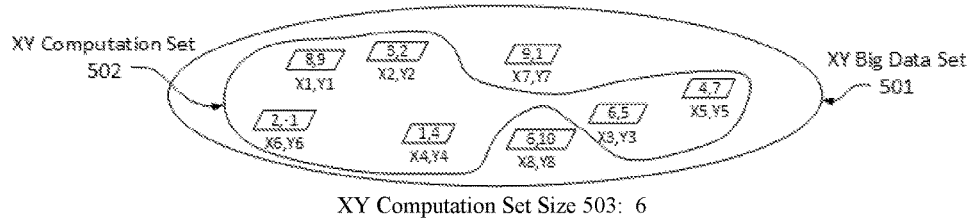

XY Computation Set Size 503: 6

Calculate Simple Linear Regression Coefficients for XY Computation Set 502

Decremental Algorithm 2:

1. Use equation 405 to calculate $\bar{x}_1$ and equation 406 to calculate $\bar{y}_1$ for the 1ˢᵗ iteration:

$$\bar{x}_1 = \frac{\sum_1^n x_i}{n} = \frac{8+3+6+1+4+2}{6} = \frac{24}{6} = 4$$

$$\bar{y}_1 = \frac{\sum_1^n y_i}{n} = \frac{9+2+5+4+7+(-1)}{6} = \frac{26}{6} = 4.3333333333333333$$

Operations in the two steps: 2 divisions, 10 additions

2. Use equation 429 to calculate $SSDX_1$ for the 1ˢᵗ iteration:

$$SSDX_1 = \sum_1^6 (x_i - \bar{x}_1)^2 = (8-4)^2 + (3-4)^2 + (6-4)^2 + (1-4)^2 + (4-4)^2 + (2-4)^2 = 34$$

Operations in this step: 6 multiplications, 5 additions, 6 subtractions

3. Use equation 432 to calculate $SDXY_1$ for the 1ˢᵗ iteration:

$$SDXY_1 = \sum_1^6 (x_i - \bar{x}_1)(y_i - \bar{y}_1) = (8-4)(9 - 4.3333333333333333) + (3-4)(2 - 4.3333333333333333) + (6-4)(5 - 4.3333333333333333) + (1-4)(4 - 4.3333333333333333) + (4-4)(7 - 4.3333333333333333) + (2-4)(-1 - 4.3333333333333333) = 34$$

Operations in this step: 6 multiplications, 5 additions, 12 subtractions

4. Use equations 435 and 436 to calculate $b1_1$ and $b0_1$ respectively for the 1ˢᵗ iteration:

$$b1_1 = \frac{SDXY_1}{SSDX_1} = \frac{34}{34} = 1.0$$

$$b0_1 = \bar{y}_1 - b1_1 \bar{x}_1 = 4.3333333333333333 - 1.0 \times 4 = 0.3333333333333333$$

Operations in this step: 1 division, 1 multiplication, 1 subtraction

There are a total of 3 divisions, 13 multiplications, 20 additions and 19 subtractions.

Fig. 5C

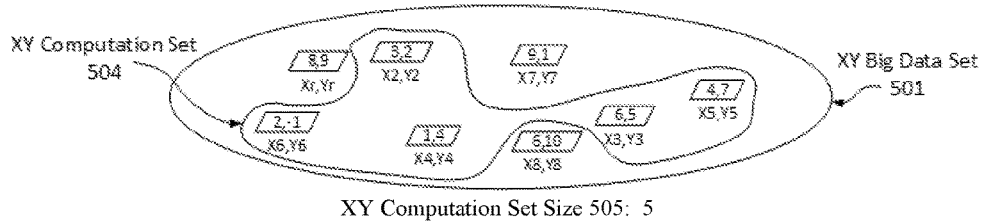

XY Computation Set Size 505: 5

Calculate Simple Linear Regression Coefficients for XY Computation Set 504

Decremental Algorithm 2:

1. Calculate 6-1 and keep its value for future calculation. Operations in this step: 1 subtraction.
2. Use equation 417 to calculate $\bar{x}_2$ and equation 418 to calculate $\bar{y}_2$ for the 2$^{nd}$ iteration:

$$\bar{x}_2 = \frac{6\bar{x}_1 - x_r}{6-1} = \frac{6 \times 4 - 8}{5} = \frac{16}{5} = 3.2$$

$$\bar{y}_2 = \frac{6\bar{y}_1 - y_r}{6-1} = \frac{6 \times 4.3333333333333333 - 9}{5} = \frac{17}{5} = 3.4$$

Operations in the two steps: 2 divisions, 2 multiplications, 2 subtractions

3. Use equation 431 to calculate $SSDX_2$ for the 2$^{nd}$ iteration:

$$SSDX_2 = SSDX_1 - (x_r - \bar{x}_2)(x_r - \bar{x}_1) = 34 - (8 - 3.2)(8 - 4) = 34 - 19.2 = 14.8$$

Operations in this step: 1 multiplication, 3 subtractions

4. Use equation 434 to calculate $SDXY_2$ for the 2$^{nd}$ iteration:

$$SDXY_2 = SDXY_1 - \frac{(6-1)(x_r - \bar{x}_2)(y_r - \bar{y}_2)}{6} = 34 - \frac{5(8 - 3.2)(9 - 3.4)}{6} = 34 - 22.4 = 11.6$$

Operations in this step: 1 division, 2 multiplications, 3 subtractions

5. Use equations 435 and 436 to calculate $b1_2$ and $b0_2$ respectively for the 2$^{nd}$ iteration:

$$b1_2 = \frac{SDXY_2}{SSDX_2} = \frac{11.6}{14.8} = 0.7837837837837838$$

$$b0_2 = \bar{y}_2 - b1_2 \bar{x}_2 = 3.4 - 0.7837837837837838 \times 3.2 = 3.4 - 2.50810810810810816$$
$$= 0.89189189189189184$$

Operations in this step: 1 division, 1 multiplication, 1 subtraction

There are a total of 4 divisions, 6 multiplications and 10 subtractions when decrementally calculating the simple linear regression coefficients.

Fig. 5C Cont'd 1

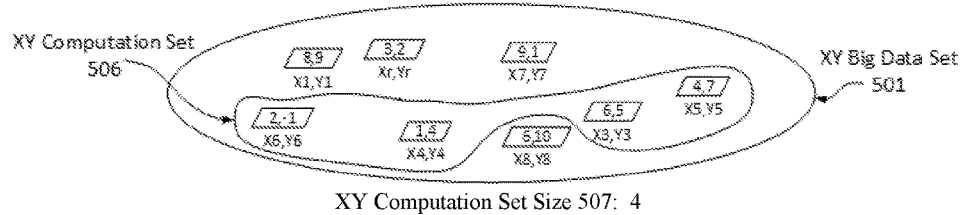

XY Computation Set Size 507: 4

Calculate Simple Linear Regression Coefficients for XY Computation Set 506

Decremental Algorithm 2:

1. Calculate 5-1 and keep its value for future calculation. Operations in this step: 1 subtraction.
2. Use equation 417 to calculate $\bar{x}_3$ and equation 418 to calculate $\bar{y}_3$ for the $3^{rd}$ iteration:

$$\bar{x}_3 = \frac{(5\bar{x}_2 - x_r)}{5-1} = \frac{(5 \times 3.2 - 3)}{4} = \frac{13}{4} = 3.25$$

$$\bar{y}_3 = \frac{(5\bar{y}_2 - y_r)}{5-1} = \frac{(5 \times 3.4 - 2)}{4} = \frac{15}{4} = 3.75$$

Operations in the this step: 2 divisions, 2 multiplications, 2 subtractions

3. Use equation 431 to calculate $SSDX_3$ for the $3^{rd}$ iteration:

$$SSDX_3 = SSDX_2 - (x_r - \bar{x}_3)(x_r - \bar{x}_2) = 14.8 - (3 - 3.25)(3 - 3.2) = 14.75$$

Operations in this step: 1 multiplication, 3 subtractions

4. Use equation 434 to calculate $SDXY_3$ for the $3^{rd}$ iteration:

$$SDXY_3 = SDXY_2 - \frac{(5-1)(x_r - \bar{x}_3)(y_r - \bar{y}_3)}{5} = 11.6 - \frac{4(3 - 3.25)(2 - 3.75)}{5} = 11.25$$

Operations in this step: 1 division, 2 multiplications, 3 subtractions

5. Use equations 435 and 436 to calculate $b1_3$ and $b0_3$ respectively for the $3^{rd}$ iteration:

$$b1_3 = \frac{SDXY_3}{SSDX_3} = \frac{11.25}{14.75} = 0.7627118644067797$$

$b0_3 = \bar{y}_3 - b1_3 \bar{x}_3 = 3.75 - 0.7627118644067797 \times 3.25 = 3.75 - 2.478813559322034025 = 1.271186440677965975$ Operations in this step: 1 division, 1 multiplication, 1 subtraction There are a total of 4 divisions, 6 multiplications and 10 subtractions.

Fig. 5C Cont'd 2

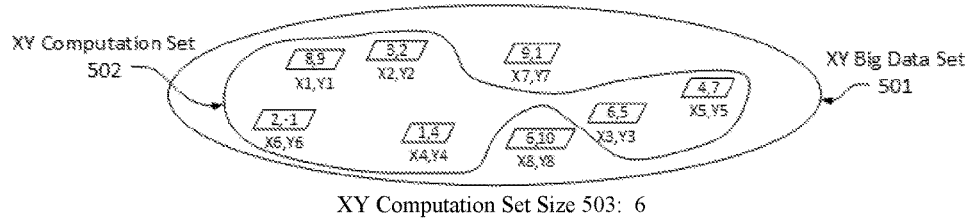

XY Computation Set Size 503: 6

Calculate Simple Linear Regression Coefficients for XY Computation Set 502

Decremental Algorithm 3:

1. Use equation 405 to calculate $\bar{x}_1$ for the 1st iteration:

$$\bar{x}_1 = \frac{\sum_1^6 x_i}{6} = \frac{8+3+6+1+4+2}{6} = \frac{24}{6} = 4$$

Operations in this step: 1 division, 5 additions

2. Use equation 406 to calculate $\bar{y}_1$ for the 1st iteration:

$$\bar{y}_1 = \frac{\sum_1^6 y_i}{6} = \frac{9+2+5+4+7+(-1)}{6} = \frac{26}{6} = 4.3333333333333333$$

Operations in this step: 1 division, 5 additions

3. Use equation 437 to calculate $XSS_1$ for the 1st iteration:

$$XSS_1 = \sum_1^6 x_i^2 = 8^2 + 3^2 + 6^2 + 1^2 + 4^2 + 2^2 = 64 + 9 + 36 + 1 + 16 + 4 = 130$$

Operations in this step: 6 multiplications, 5 additions

4. Use equation 440 to calculate $SXY_1$ for the 1st iteration:

$$SXY_1 = \sum_1^6 x_i y_i = 8 \times 9 + 3 \times 2 + 6 \times 5 + 1 \times 4 + 4 \times 7 + 2 \times (-1) = 138$$

Operations in this step: 6 multiplications, 5 additions

5. Use equations 443 and 444 to calculate $b1_1$ and $b0_1$ respectively for the 1st iteration:

$$b1_1 = \frac{SXY_1 - 6\bar{x}_1\bar{y}_1}{XSS_1 - 6\bar{x}_1^2} = \frac{138 - 6 \times 4 \times 4.3333333333333333}{130 - 6 \times 4^2} = \frac{34.0000000000000008}{34} = 1.0$$

$$b0_1 = \bar{y}_1 - b1_1\bar{x}_1 = 4.3333333333333333 - 1.0 \times 4 = 0.3333333333333333$$

Operations in this step: 1 division, 4 multiplications, 3 subtractions

There are a total of 3 divisions, 16 multiplications, 20 additions and 3 subtractions.

Fig. 5D

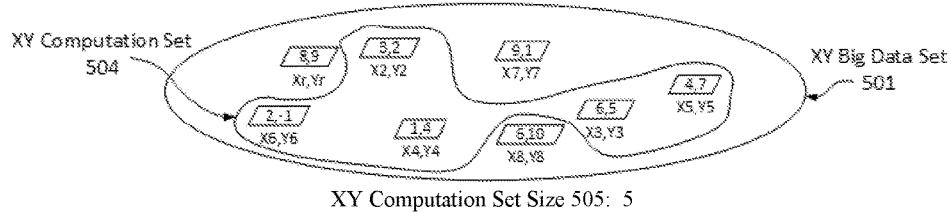

XY Computation Set Size 505: 5

Calculate Simple Linear Regression Coefficients for XY Computation Set 504

Decremental Algorithm 3:

1. Calculate 6-1 and keep its value for future calculation. Operations in this step: 1 subtraction.
2. Use equation 417 to calculate $\bar{x}_2$ for the 2$^{nd}$ iteration:

$$\bar{x}_2 = \frac{6\bar{x}_1 - x_r}{6-1} = \frac{6 \times 4 - 8}{5} = \frac{16}{5} = 3.2$$

Operations in this step: 1 division, 1 multiplication, 1 subtraction

3. Use equation 418 to calculate $\bar{y}_2$ for the 2$^{nd}$ iteration:

$$\bar{y}_2 = \frac{6\bar{y}_1 - y_r}{6-1} = \frac{6 \times 4.3333333333333333 - 9}{5} = \frac{17}{5} = 3.4$$

Operations in this step: 1 division, 1 multiplication, 1 subtraction

4. Use equation 439 to calculate $XSS_2$ for the 2$^{nd}$ iteration:

$$XSS_2 = XSS_1 - x_r^2 = 130 - 8^2 = 66$$

Operations in this step: 1 multiplication, 1 subtraction

5. Use equation 442 to calculate $SXY_2$ for the 2$^{nd}$ iteration:

$$SXY_2 = SXY_1 - x_r y_r = 138 - 8 \times 9 = 66$$

Operations in this step: 1 multiplication, 1 subtraction

6. Use equations 443 and 444 to calculate $b1_2$ and $b1_2$ respectively for the 2$^{nd}$ iteration:

$$b1_2 = \frac{SXY_2 - (6-1)\bar{x}_2\bar{y}_2}{XSS_2 - (6-1)\bar{x}_2^2} = \frac{66 - 5 \times 3.2 \times 3.4}{66 - 5 \times 3.2^2} = \frac{66 - 54.4}{66 - 51.2} = \frac{11.6}{14.8} = 0.7837837837837838$$

$$b0_2 = \bar{y}_2 - b1_2\bar{x}_2 = 3.4 - 0.7837837837837838 \times 3.2 = 3.4 - 2.50810810810810816 = 0.89189189189189184$$

Operations in this step: 1 division, 5 multiplications, 3 subtractions

There are a total of 3 divisions, 9 multiplications and 8 subtractions when decrementally calculating the simple linear regression coefficients.

Fig. 5D Cont'd 1

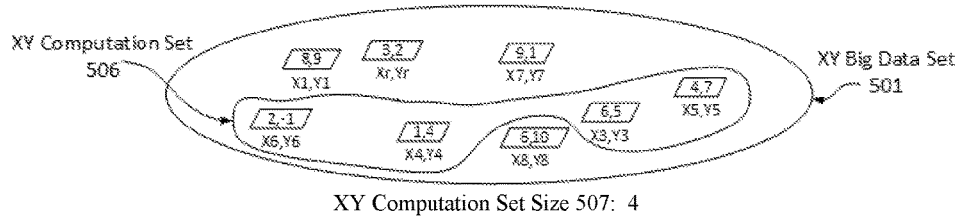

XY Computation Set Size 507: 4

Calculate Simple Linear Regression Coefficients for XY Computation Set 506

Decremental Algorithm 3:

1. Calculate 5-1 and keep its value for future calculation. Operations in this step: 1 subtraction.
2. Use equation 417 to calculate $\bar{x}_3$ for the 3$^{rd}$ iteration:

$$\bar{x}_3 = \frac{(5\bar{x}_2 - x_r)}{5-1} = \frac{(5 \times 3.2 - 3)}{4} = \frac{13}{4} = 3.25$$

Operations in this step: 1 division, 1 multiplication, 1 subtraction

3. Use equation 418 to calculate $\bar{y}_3$ for the 3$^{rd}$ iteration:

$$\bar{y}_3 = \frac{(5\bar{y}_3 - y_r)}{5-1} = \frac{(5 \times 3.4 - 2)}{4} = \frac{15}{4} = 3.75$$

Operations in this step: 1 division, 1 multiplication, 1 subtraction

4. Use equation 439 to calculate $XSS_3$ for the 3$^{rd}$ iteration:

$$XSS_3 = XSS_2 - x_r^2 = 66 - 3^2 = 57$$

Operations in this step: 1 multiplication, 1 subtraction

5. Use equation 442 to calculate $SXY_3$ for the 3$^{rd}$ iteration:

$$SXY_3 = SXY_2 - x_r y_r = 66 - 3 \times 2 = 60$$

Operations in this step: 1 multiplication, 1 subtraction

6. Use equations 443 and 444 to calculate $b1_3$ and $b0_3$ respectively for the 3$^{rd}$ iteration:

$$b1_3 = \frac{SXY_3 - (5-1)\bar{x}_3\bar{y}_3}{XSS_3 - (5-1)\bar{x}_3^2} = \frac{60 - 4 \times 3.25 \times 3.75}{57 - 4 \times 3.25^2} = \frac{60 - 48.75}{57 - 42.25} = \frac{11.25}{14.75} = 0.7627118644067797$$

$$b0_3 = \bar{y}_3 - b1_3\bar{x}_3 = 3.75 - 0.7627118644067797 \times 3.25 = 3.75 - 2.478813559322034025 = 1.271186440677965975$$

Operations in this step: 1 division, 5 multiplications, 3 subtractions

There are a total of 3 divisions, 9 multiplications and 8 subtractions.

Fig. 5D Cont'd 2

|  | Division | Multiplication | Addition | Subtraction |
|---|---|---|---|---|
| Traditional Algorithm | 3 | 9 | 12 | 13 |
| Decremental Algorithm 1 | 3 | 9 | 0 | 8 |
| Decremental Algorithm 2 | 4 | 6 | 0 | 10 |
| Decremental Algorithm 3 | 3 | 9 | 0 | 8 |

|  | Division | Multiplication | Addition | Subtraction |
|---|---|---|---|---|
| Traditional Algorithm | 3 | 2,000,001 | 3,999,996 | 3,000,001 |
| Decremental Algorithm 1 | 3 | 9 | 0 | 8 |
| Decremental Algorithm 2 | 4 | 6 | 0 | 10 |
| Decremental Algorithm 3 | 3 | 9 | 0 | 8 |

DECREMENTAL SIMPLE LINEAR REGRESSION COEFFICIENT CALCULATION FOR BIG DATA OR STREAMED DATA USING COMPONENTS

CROSS-REFERENCE TO RELATED APPLICATIONS

This application claims the benefit of provisional patent application Ser. No. 62/126,447, filed 2015 Feb. 28 by the present inventor.

BACKGROUND AND RELEVANT ART

Internet, mobile communications, navigation, online gaming, sensing technologies and large scale computing infrastructures have produced large amounts of data sets every day. Big Data is data beyond the processing capacity of conventional database systems and analyzing capacity of traditional analyzing methods due to its large volume and fast moving and growing speed. More companies now rely on Big Data to make real-time decisions to solve various problems. Current methods involve utilizing a lot of computational resources, which are very costly, yet still may not satisfy the needs of real-time decision making based on the newest information, especially in the financial industry. How to efficiently, promptly and cost-effectively process and analyze Big Data presents a difficult challenge to data analysts and computer scientists.

Streamed data is data that is constantly being received by a receiver while being delivered by a provider. Streamed data may be real-time data gathered from sensors and continuously transferred to computing devices or electronic devices. Often this includes receiving similarly formatted data elements in succession separated by some time interval. Streamed data may also be data continuously read from storage devices, e.g., storage devices on multi-computing devices which store a Big Data set. Stream processing has become a focused research area recently due to the following reasons. One reason is that the input data are coming too fast to store entirely for batch processing, so some analysis have to be performed when the data streams in. The second reason is that immediate responses to any changes of the data are required in some application domains, e.g., mobile related applications, online gaming, navigation, real-time stock analysis and automated trading, etc. The third reason is that some applications or electronic devices require stream processing due to their nature, e.g., audio, video and digital TV, etc.

Processing streamed data may include performing calculations on multiple data elements. Thus, a computing device receiving a stream of data elements typically includes a buffer so that some number of data elements may be stored. Processing the streamed data elements may include accessing data elements stored in the buffer. When performing statistical calculations on streamed data elements, buffer requirements may be quite large. For example, when calculating simple linear regression a (potentially large) number of data elements may need to be accessed.

In addition, algorithms on streamed data processing may be extended to Big Data processing, because Big Data sets are accumulated over time and may be considered as data streams with irregular time intervals.

For Big data set or streamed data processing, some statistical calculations are recalculated as a Big Data set is changed or existing streamed data elements are removed. Thus, the (potentially large) number of data elements may be repeatedly accessed. For example, it may be that simple linear regression coefficients are calculated for a computation set with n pairs of data elements and an input comprising a pair of data elements tells which pair of data elements is removed from the computation set. As such, every time a pair of data elements (one data element from each variable) is accessed or received, one pair of the data elements is removed from the computation set. The all 2n−2 data elements in the computation set are then accessed to recalculate the simple linear regression coefficients.

When performing simple linear regression coefficient calculation on all 2n−2 data elements, all the 2n−2 data elements in the computation set will be visited and used. As such, each pair of data elements in the computation set needs to be accessed for recalculating the simple linear regression whenever there is a change in the computation set. Depending on necessity, the computation set size n could be extremely large, so the data elements in a computation set could be distributed over a cloud comprising hundreds of thousands of computing devices. Re-calculating simple linear regression coefficients on Big Data or streamed data after some data changes inefficiently uses time and computing resources.

BRIEF SUMMARY

The present disclosure describes methods, systems, and computing system program products for decrementally calculating simple linear regression coefficients for Big Data or streamed data. A computing system comprises one or more computing devices. Each of the computing devices comprises one or more processors. The computing system comprises one or more storage media. The computing system has stored one or two data sets on the one or more storage media or has access to one or two data streams. The computing system maintains a computation set size counter. The computation set size counter indicates the number of pairs of data elements in a computation set of the one or two data sets or the one or two data streams. Embodiments of the invention include decrementally calculating one or more components of simple linear regression coefficients for a modified computation set based on one or more components calculated for the previous computation set and then calculating the simple linear regression coefficients for the modified computation set based on one or more of the decrementally calculated components. Decrementally calculating simple linear regression coefficients not only avoids visiting all the data element in the computation set but also avoids storing the whole computation set as traditional algorithms would do, and thus increases calculation efficiency, saves computing resources and reduces computing system's power consumption.

A component of simple linear regression coefficients is a quantity or expression appearing in the simple linear regression coefficients' definition equations or any transforms of the equations. Simple linear regression coefficients may be calculated by using one or more components of the simple linear regression coefficients.

A computation set size counter and one or more components of simple linear regression coefficients need to be initialized before decremental calculation of the one or more components begins. The initialization of the computation set size counter comprises setting its value with the number of pairs of data elements in a computation set or accessing or receiving a specified computation set size. The initialization of the one or more components comprises calculating the one or more components through their definitions based on the data elements in the computation set or accessing or receiving pre-calculated one or more components from one or more computing-device-readable media.

The computing system initializes a computation set size counter $n(n>0)$ and $v(1 \le v \le p, p \ge 1)$ components of simple linear regression coefficients b1 and b0 for a computation set.

The computing system accesses or receives one pair of Big Data or streamed data elements to be removed from the computation set.

The computing system removes the accessed or received pair of data elements from one or two optional data buffers as needed.

The computing system modifies the computation set size counter by decreasing its value by 1. The computing system modifies one or more components based on the pair of data elements accessed or received.

The computing system directly decrementally calculates $v(1 \le v \le p)$ components of simple linear regression coefficients for the modified computation set. Directly decrementally calculating the v components includes directly decrementally calculating each of the v components one by one. Directly decrementally calculating a component of simple linear regression coefficients includes: accessing the component calculated for the prior computation set and removing any contribution of the removed pair of data elements from the component mathematically.

The computing system indirectly decrementally calculating $w=p-v$ components of simple linear regression coefficients as needed: indirectly decrementally calculating the w components includes indirectly decrementally calculating each of the w components one by one. Indirectly decrementally calculating a component includes calculating the component based on components other than the component itself.

The computing system calculates simple linear regression coefficients as needed based on one or more decrementally calculated components of simple linear regression coefficients.

The computing system may keep accessing or receiving a pair of data elements to be removed from the computation set, modifying the computation set and the computation set size counter, decrementally calculating one or more components and calculating simple linear regression coefficients as needed using one or more decrementally calculated components, and the computing system may repeat this process for as many times as needed.

This summary is provided to introduce a selection of concepts in a simplified form that are further described below in the Detailed Description. This summary is not intended to identify key features or essential features of the claimed subject matter, nor is it intended to be used as an aid in determining the scope of the claimed subject matter.

Additional features and advantages of the invention will be set forth in the description which follows, and in part will be obvious from the description, or may be learned by the practice of the invention. The features and advantages of the invention may be realized and obtained by means of the instruments and combinations particularly pointed out in the appended claims. These and other features of the present invention will become more fully apparent from the following description and appended claims, or may be learned by the practice of the invention as set forth hereinafter.

BRIEF DESCRIPTION OF THE DRAWINGS

In order to describe the manner in which the above-recited and other advantages and features of the invention may be obtained, a more particular description of the invention briefly described above will be rendered by reference to specific embodiments thereof which are illustrated in the appended drawings. Understanding that these drawings depict only typical embodiments of the invention and are not therefore to be considered to be limiting of its scope, the invention will be described and explained with additional specificity and detail through the use of the accompanying drawings in which:

FIG. 4A illustrates the definition of simple linear regression coefficients and traditional equations for calculating simple linear regression coefficients on a computation set.

FIG. 4B illustrates some components of simple linear regression coefficients, which may be used for decrementally calculating simple linear regression coefficients on a computation set.

FIG. 4C illustrates the first example decremental simple linear regression coefficient calculation algorithm (decremental algorithm 1) and its equations for decrementally calculating simple linear regression coefficients based on decrementally calculated components $XS_{k+1}$ or $\bar{x}_{k+1}$, $YS_{k+1}$ or $\bar{y}_{k+1}$, $XV_{k+1}$, and $SXY_{k+1}$.

FIG. 4D illustrates the second example decremental simple linear regression coefficient calculation algorithm (decremental algorithm 2) and its equations for decrementally calculating simple linear regression coefficients in a computation set based on decrementally calculated components $XS_{k+1}$ or $\bar{x}_{k+1}$ $YS_{k+1}$ or $\bar{y}_{k+1}$, $SSDX_{k+1}$, and $SDXY_{k+1}$.

FIG. 4E illustrates the third decremental simple linear regression coefficient calculation algorithm (decremental algorithm 3) and its equations for decrementally calculating simple linear regression coefficients in a computation set based on decrementally calculated components $XS_{k+1}$ or $\bar{x}_{k+1}$, $YS_{k+1}$ or $\bar{y}_{k+1}$, $XSS_{k+1}$, and $SXY_{k+1}$.

FIG. 5A illustrates an example of calculating simple linear regression coefficients using traditional algorithms as shown in FIG. 4A.

FIG. 5B illustrates an example of calculating simple linear regression coefficients using decremental algorithm 1 as shown in FIG. 4C.

FIG. 5C illustrates an example of calculating simple linear regression using decremental algorithm 2 as shown in FIG. 4D.

FIG. 5D illustrates an example of calculating simple linear regression coefficients using decremental algorithm 3 as shown in FIG. 4E.

FIG. 6 illustrates computational loads for traditional algorithms and decremental algorithms with a computation set of size 4.

FIG. 7 illustrates computational loads for traditional algorithms and decremental algorithms with a computation set of size 1,000,000.

DETAILED DESCRIPTION

Figure 1:
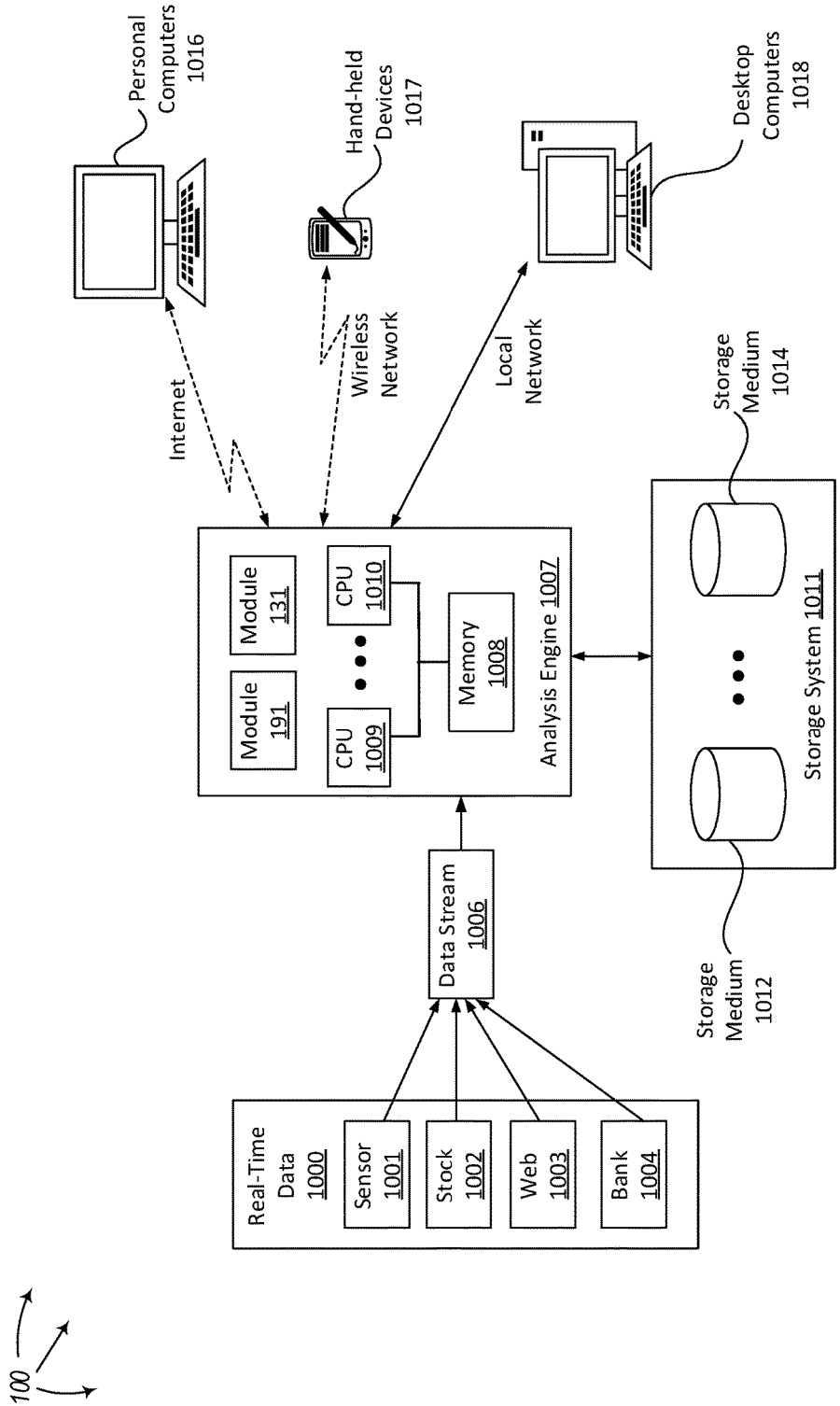
FIG. 1 illustrates a high-level overview of an example computing system that facilitates decrementally calculating simple linear regression coefficients for Big Data or streamed data.

The present disclosure describes methods, systems, and computing system program products for decrementally calculating simple linear regression coefficients for Big Data or streamed data. A computing system comprises one or more computing devices. Each of the computing devices comprises one or more processors. The computing system comprises one or more storage media. The computing system has stored one or two data sets on the one or more storage media or has access to one or two data streams. The computing system maintains a computation set size counter. The computation set size counter indicates the number of pairs of data elements in a computation set of the one or two data sets or the one or two data streams. Embodiments of the invention include decrementally calculating one or more components of simple linear regression coefficients for a modified computation set based on one or more components calculated for the previous computation set and then calculating the simple linear regression coefficients for the modified computation set based on one or more of the decrementally calculated components. Decrementally calculating simple linear regression coefficients not only avoids visiting all the data element in the computation set but also avoids storing the whole computation set as traditional algorithms would do, and thus increases calculation efficiency, saves computing resources and reduces computing system's power consumption.

Linear regression is an approach for modeling the relationship between a scalar dependent variable Y and one or more explanatory variables denoted X. The case of one explanatory variable is called simple linear regression. Simple linear regression has many practical uses. Most applications fall into one of the following two broad categories:

If the goal is prediction, forecasting, or reduction, simple linear regression may be used to fit a predictive model to an observed data set of Y and X values. After developing such a model, if an additional value of X is then given without its accompanying value of Y, the fitted model may be used to make a prediction of the value of Y.

Given a variable Y and a variable X that may be related to Y, simple linear regression analysis may be applied to quantify the strength of the relationship between Y and X.

A statistical model is a description of a state or process. Simple linear regression is for modeling the linear relationship between two variables. A simple linear regression model is often written as the following form $$Y = \beta 0 + \beta 1 X + \varepsilon$$

Where Y is the dependent variable, $\beta 0$ is the Y intercept, $\beta 1$ is the gradient or the slope of the regression line, X is the independent variable, and $\varepsilon$ is the error. It is usually assumed that error $\varepsilon$ is normally distributed with $E(\varepsilon)=0$ and a constant variance $Var(\varepsilon)=\sigma^2$ in the simple linear regression. Linear regression calculation involves estimating $\beta 1$ and $\beta 0$ based on observed values from X and Y. The least squares principle for the simple linear regression model is to find estimates b1 and b0 such that the sum of the squared distance from actual response $y_i$ and predicted response $\hat{y}_i = \beta 0 + \beta 1 x_1$ reaches the minimum among all possible choices of regression coefficients $\beta 0$ and $\beta 1$. The relationship between Y and X may be described by a fitted regression line $\hat{Y} = b0 + b1X$. The estimates b1 and b0 may be calculated using following equations:

$$b1 = \frac{\sum_{1}^{n} (x_i - \bar{x}_k)(y_i - \bar{y}_k)}{\sum_{1}^{n} (x_i - \bar{x}_k)^2}$$

$$b0 = \bar{y}_k - b1\bar{x}_k$$

The estimates b1 and b0 are called simple linear regression coefficients. Once b1 is calculated, b0 may be calculated.

As used herein, a computation set is a data set which contains data elements involved in simple linear regression coefficient calculation. A computation set is equivalent to a moving computation window when calculating simple linear regression coefficients on streamed data or time series data. Within the description of embodiments of the present invention, the difference between a computation window and a computation set is that data elements in a computation window are ordered but that in a computation set are not.

Simple linear regression calculation works on two variables, however data elements involved in simple linear regression coefficient calculation should be calculated in pairs (i.e., the coordinates of a point in a 2-D space), thus the data elements from two variables are grouped into pairs and put into a single computation set. The computation set may be either input and stored separately or input and stored in a combined interleaved manner. For the former case, there will be two Big Data sets or input streams and each Big Data set or input stream contains the data elements of one computation set respectively, and there will be two buffers and each buffer stores the data elements of one computation set respectively. For the latter case, there will be a single Big Data set or input stream and the Big Data set or input stream contains multiple data pairs with each data pair containing one data element from each computation set respectively.

As used herein, a component of simple linear regression coefficients is a quantity or expression appearing in the simple linear regression coefficients' definition equations or any transforms of the equations. A simple linear regression coefficient is the largest component of a simple linear regression coefficient itself. Simple linear regression coefficients may be calculated using one or more components of the simple linear regression coefficients. Some example components of simple linear regression coefficients may be found in FIG. 4B.

A component may be either directly decrementally calculated or indirectly decrementally calculated. The difference is that when directly decrementally calculating a component, the component is calculated based on the component's value in previous iteration but when indirectly decrementally calculating a component, the component is calculated based on components other than the component itself.

For a given component, it might be directly decrementally calculated in one algorithm but indirectly decrementally calculated in another algorithm.

For a given algorithm, assume the total number of different components is $p(p \geq 1)$, the number of directly decrementally calculated components is $v(1 \leq v \leq p)$, then the number of indirectly decrementally calculated components is $w=p-v(0 \leq w<p)$. For any algorithm, there will be at least one component being directly decrementally calculated. It is possible that all components are directly decrementally calculated (in this case $v=p$ and $w=0$). However, directly decrementally calculated components must be calculated in every iteration no matter if simple linear regression coefficients are accessed or not in a specific iteration.

For a given algorithm, if a component is directly decrementally calculated, then the component must be calculated in every iteration (i.e., whenever a pair of data elements is removed from the computation set). However, if a component is indirectly decrementally calculated, then the component may be calculated as needed using one or more components other than the component itself, i.e., when simple linear regression coefficients need to be calculated and accessed. Thus, when simple linear regression coefficients are not accessed in a specific iteration, only a small number of components are decrementally calculated. It should be understood that an indirectly decrementally calculated component may also be used in the calculation of a directly decrementally calculated component. In that case, the indirectly decrementally calculated component should also be calculated in every iteration.

Embodiments of the invention include decrementally calculating one or more components of simple linear regression coefficients in the modified computation set based on one or more components calculated for the prior computation set.

The computing system decrementally calculates one or more components of simple linear regression coefficients starting from a non-empty computation set where a computation set size counter and one or more components have already been initialized. The initialization of the computation set size comprises setting its value with the number of pairs of data elements contained in the computation set or accessing or receiving a specified computation set size. The initialization of the one or more components comprises calculating the one or more components through their definitions based on the data elements in the computation set or accessing or receiving pre-calculated one or more components from one or more computing-device-readable media.

The computing system accesses or receives a pair of data elements to be removed from the non-empty computation set. The pair of data elements must be an existing pair of data elements in the non-empty computation set, i.e., is must have been added to the computation set earlier.

The computing system removes the accessed or received pair of data elements from one or two optional data buffers as needed. Pure decremental simple linear regression coefficient calculation only needs access to the pair of data elements accessed or received, so the computing system does not necessarily allocate a storage space to keep all the data elements of the computation set but at least allocate a storage space to keep the computation set size counter and one or more components of simple linear regression coefficients for the computation set. Modifying the computation set may be reflected by modifying the computation set size counter and one or more components of simple linear regression coefficients for the computation set. However, since iterative simple linear regression coefficient calculation requires access to earlier accessed or received data elements, when combining decremental simple linear regression coefficient calculation with iterative simple linear regression coefficient calculation, the accessed or received pair of data elements needs to be removed from one or two data buffers allocated for iterative simple linear regression coefficient calculation. Thus, the computing system may optionally have one or two data buffers for keeping data elements in the computation set.

The computing system modifies the computation set by: removing the accessed or received pair of data elements from the computation set and modifying the computation set size counter correspondingly by decreasing its value by 1.

The computing system decrementally calculates one or more components of simple linear regression coefficients for the modified computation set based on one or more components calculated for the prior computation set and then calculates the simple linear regression coefficients for the modified computation set based on one or more decrementally calculated components. Decrementally calculating the one or more components includes calculating each of the one or more components for the modified computation set one by one.

The computing system decrementally calculating one or more components of simple linear regression coefficients for the modified computation set includes directly decrementally calculating $v(1 \leq v \leq p)$ components of simple linear regression coefficients for the modified computation set based on v components for the prior computation set. Directly decrementally calculating v components of simple linear regression coefficients includes accessing the pair of data elements removed from the modified computation set and accessing each of the v components calculated for the prior computation set. Directly decrementally calculating v components of simple linear regression coefficients includes removing any contribution of the removed pair of data elements from each of the v components mathematically. For example, directly decrementally calculating the components includes calculating a sum or mean for each variable in the modified computation set respectively. Calculating the sum or mean for each variable in the modified computation set includes accessing the pair of data elements removed from the computation set and accessing the sum or mean. Calculating the sum or mean for each variable in the modified computation set includes removing any contribution of the removed pair of data elements from the sum or mean mathematically.

The computing system decrementally calculating one or more components of simple linear regression coefficients for the modified computation set includes indirectly decrementally calculating w=p−v components of simple linear regression coefficients for the modified computation set as needed. Indirectly decrementally calculating the w components of simple linear regression coefficients includes indirectly decrementally calculating each of the w components one by one. Indirectly decrementally calculating a component includes accessing and using one or more components other than the component itself. The one or more components could have been initialized, directly decrementally calculated or indirectly decrementally calculated.

The computing system calculates simple linear regression coefficients as needed based on one or more decrementally calculated components of simple linear regression coefficients.

The computing system may keep accessing or receiving a pair of data elements to be removed from the non-empty computation set, modifying the computation set and the computation set size counter, decrementally calculating one or more components and calculating simple linear regression coefficients as needed using one or more decrementally calculated components, and the computing system may repeat this process for as many times as needed.

Embodiments of the present invention may comprise or utilize a special purpose or general-purpose computing device including computing device hardware, such as, for example, one or more processors and storage devices, as discussed in greater detail below. Embodiments within the scope of the present invention also include physical and other computing-device-readable media for carrying or storing computing-device-executable instructions and/or data structures. Such computing-device-readable media may be any available media that may be accessed by a general purpose or special purpose computing device. Computing-device-readable media that store computing-device-executable instructions are computing device storage media (devices). Computing-device-readable media that carry computing-device-executable instructions are transmission media. Thus, by way of example, and not limitation, embodiments of the invention may comprise at least two distinctly different kinds of computing-device-readable media: computing device storage media (devices) and transmission media.

Computing device storage media (devices) includes RAM, ROM, EEPROM, CD-ROM, solid state drives ("SSDs") (e.g., based on RAM), Flash memory, phase-change memory ("PCM"), other types of memory, other optical disk storage, magnetic disk storage or other magnetic storage devices, or any other medium which may be used to store desired program code means in the form of computing-device-executable instructions or data structures and which may be accessed by a general purpose or special purpose computing device.

A "network" is defined as one or more data links that enable the transport of electronic data between computing devices and/or modules and/or other electronic devices. When information is transferred or provided over a network or another communications connection (either hardwired, wireless, or a combination of hardwired or wireless) to a computing device, the computing device properly views the connection as a transmission medium. Transmissions media may include a network and/or data links which may be used to carry desired program code means in the form of computing-device-executable instructions or data structures and which may be accessed by a general purpose or special purpose computing device. Combinations of the above should also be included within the scope of computing-device-readable media.

Further, upon reaching various computing device components, program code means in the form of computing-device-executable instructions or data structures may be transferred automatically from transmission media to computing device storage media (devices) (or vice versa). For example, computing-device-executable instructions or data structures received over a network or data link may be buffered in RAM within a network interface module (e.g., a "NIC"), and then eventually transferred to computing device RAM and/or to less volatile computing device storage media (devices) at a computing device. Thus, it should be understood that computing device storage media (devices) may be included in computing device components that also (or even primarily) utilize transmission media.

Computing-device-executable instructions comprise, for example, instructions and data which, when executed at a processor, cause a general purpose computing device, special purpose computing device, or special purpose processing device to perform a certain function or group of functions. The computing-device-executable instructions may be, for example, binaries, intermediate format instructions such as assembly language, or even source code. Although the subject matter has been described in language specific to structural features and/or methodological acts, it is to be understood that the subject matter defined in the appended claims is not necessarily limited to the described features or acts described above. Rather, the described features and acts are disclosed as example forms of implementing the claims.

Those skilled in the art will appreciate that embodiments of the present invention may be practiced in network computing environments with many types of computing device configurations, including, personal computers, desktop computers, laptop computers, message processors, hand-held devices, multi-processor systems, microprocessor-based or programmable consumer electronics, network PCs, mini-computers, mainframe computers, supercomputers, mobile telephones, PDAs, tablets, pagers, routers, switches, and the like. Embodiments of the present invention may also be practiced in distributed system environments where local and remote computing devices, which are linked (either by hardwired data links, wireless data links, or by a combination of hardwired and wireless data links) through a network, both perform tasks. In a distributed system environment, program modules may be located in both local and remote memory storage devices.

Embodiments of the invention may also be implemented in cloud computing environments. In this description and the following claims, "cloud computing" is defined as a model for enabling on-demand network access to a shared pool of configurable computing resources. For example, cloud computing may be employed in the marketplace to offer ubiquitous and convenient on-demand access to the shared pool of configurable computing resources. The shared pool of configurable computing resources may be rapidly provisioned via virtualization and released with low management effort or service provider interaction, and then scaled accordingly.

A cloud computing model may be composed of various characteristics such as, for example, on-demand self-service, broad network access, resource pooling, rapid elasticity, measured service, and so forth. A cloud computing model may also expose various service models, such as, for example, Software as a Service ("SaaS"), Platform as a Service ("PaaS"), and Infrastructure as a Service ("IaaS"). A cloud computing model may also be deployed using different deployment models such as private cloud, community cloud, public cloud, hybrid cloud, and so forth. In this description and in the claims, a "cloud computing environment" is an environment in which cloud computing is employed.

FIG. 1 illustrates a high-level overview of an example computing system 100 that facilitates decrementally calculating simple linear regression coefficients for Big Data or streamed data. Referring to FIG. 1, computing system 100 comprises multiple devices connected by different networks, such as local network, internet and wireless network, etc. The multiple devices include, for example, a data analysis engine 1007, a storage system 1011, live data stream 1006, and multiple distributed computing devices that may schedule data analysis tasks and/or query data analysis results, such as personal computer 1016, hand-held devices 1017 and desktop computer 1018, etc. Data analysis engine 1007 may comprise one or more processors, e.g., CPU 1009 and CPU 1010, one or more system memory, e.g., system memory 1008, simple linear regression coefficient calculation module 191 and component calculation modules 131. Simple linear regression coefficient calculation module 191 and component calculation modules 131 will be illustrated in more details in other figures. Storage system 1011 may comprise one or more storage media, e.g., storage medium 1012 and storage medium 1014, which may be used for hosting Big Data sets. Data sets on storage system 1011 may be accessed by data analysis engine 1007. In general, data stream 1006 may comprise streamed data from different data sources, for example, stock quotes, audio data, video data, geospatial data, web data, mobile communication data, online gaming data, banking transaction data, sensor data, closed-captioning data, etc. To depict a few, real-time data 1000 may comprise data collected from sensor 1001, stock 1002, web 1003 and bank 1004, etc. in real-time. Data analysis engine 1007 may receive data elements from data stream 1006. It should be understood that FIG. 100 is provided to introduce a selection of concepts in a much simplified form, for example, distributed devices 1016 and 1017 may need to go through a firewall to connect data analysis engine 1007, and data accessed or received from data stream 1006 and/or storage system 1011 by data analysis engine 1007 may be filtered by data filters, etc.

Figure 1A:
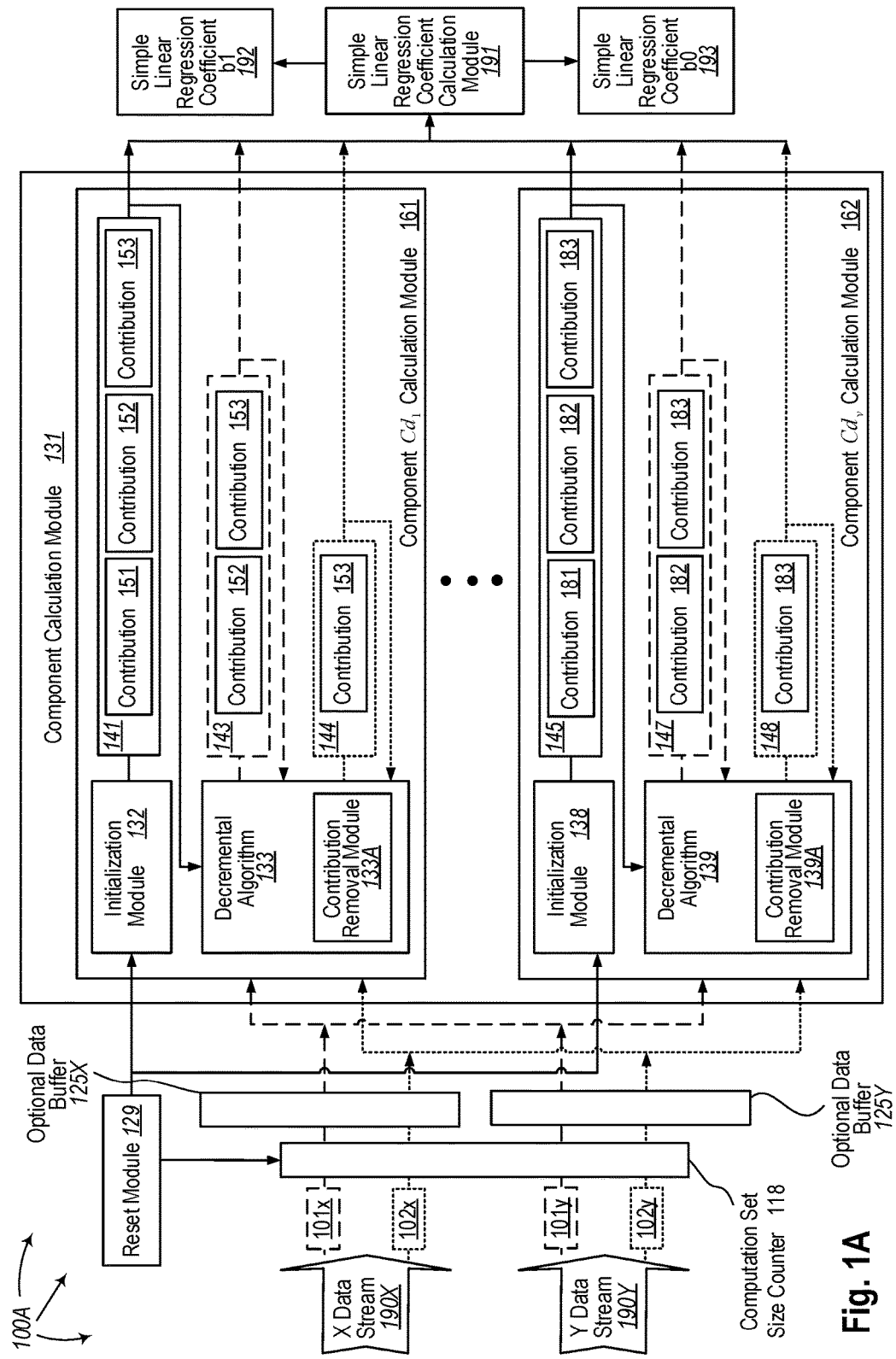
FIG. 1A illustrates an example computing system architecture that facilitates decrementally calculating simple linear regression coefficients for streamed data with two inputs with all components being directly decrementally calculated.

FIG. 1A illustrates an example computing system architecture 100A that facilitates decrementally calculating simple linear regression coefficients for Big Data or streamed data with two inputs with all components being directly decrementally calculated. FIG. 1A illustrates 1007 and 1006 shown in FIG. 1. Referring to FIG. 1A, computing system architecture 100A includes decremental component calculation module 131, simple linear regression calculation module 191 and simple linear regression coefficients b1 192 and b0 193. Decremental component calculation module 131 may be connected to (or is part of) a network, such as, for example, a Local Area Network ("LAN"), a Wide Area Network ("WAN"), and even the Internet. Accordingly, decremental component calculation module 131 as well as any other connected computing devices and their components, may send and receive message related data (e.g., Internet Protocol ("IP") datagrams and other higher layer protocols that utilize IP datagrams, such as, User Datagram Protocol ("UDP"), Real-time Streaming Protocol ("RTSP"), Real-time Transport Protocol ("RTP"), Microsoft® Media Server ("MMS"), Transmission Control Protocol ("TCP"), Hypertext Transfer Protocol ("HTTP"), Simple Mail Transfer Protocol ("SMTP"), etc.) over the network. The output of component calculation module 131 will be used as the input of simple linear regression coefficient calculation module 191, and simple linear regression coefficient calculation module 191 will generate simple linear regression coefficients b1 192 and b0 193.

In general, X data stream 190X and Y data stream 190Y may be a sequence of digitally encoded signals (e.g., packets of data or data packets) respectively used to transmit or receive information that is in the process of being transmitted. X Data stream 190X and Y data stream 190Y may stream data elements, such as, for example, stock quotes, audio data, video data, geospatial data, web data, mobile communication data, online gaming data, banking transaction data, sensor data, closed-captioning data, etc., to computing system architecture 100A. X data stream 190X and Y data stream 190Y may stream stored data or be a live stream respectively. Data streams 190X and 190Y transmit data elements to be removed from an existing non-empty computation set XY.

Decremental simple linear regression coefficient calculation starts from an existing non-empty computation set where a computation set size counter and one or more components of simple linear regression coefficients for the computation set may have already been initialized or calculated. If not, one or more components of simple linear regression coefficients may be initialized by accessing all data elements in the computation set and calculating the components one by one according to its definition using the all data elements in the computation set. For example, in computing system architecture 100A, components ranging from $Cd_1$ 141 and $Cd_v$ 145 may have been initialized. As depicted in FIG. 1A, component $Cd_1$ 141 includes contribution 151 (a contribution from a pair of data elements ($101x$, $101y$)), contribution 152 (a contribution from a pair of data elements ($102x$, $102y$)), and contribution 153 (contributions from other data elements). Similarly, component $Cd_v$ 145 includes contribution 181 (a contribution from a pair of data elements ($101x$, $101y$)) and contribution 182 (a contribution from a pair of data elements ($102x$,$102y$)), and contribution 183 (contributions from other data elements).

Computation set size counter 118 may be implemented in hardware or software. When it is implemented in hardware, counter 118 may be a small device that may update a computation set size stored in a location in counter 118. When it is implemented in software, counter 118 may be just a variable stored in RAM, hard drive or any other computing-device-readable storage media, and the content of counter 118 is a computation set size. Computation set size counter 118 may be used to keep track the size of a computation set. Whenever receiving a pair of data elements, the computing system modifies the computation set by removing the pair of data elements from the computation set and modifies the computation set size counter 118 by decreasing its content or value by 1. Computation set size counter 118 may be accessed or received by component calculation module 131, and it may be set to a specific value by reset module 129 when decremental simple linear regression coefficients calculation starts working on a non-empty computation set. Within the description of this disclosure, a computation set size counter is equivalent to a computation set size and may be used interchangeably.

For example, as depicted in FIG. 1A, when a pair of data elements ($101x,101y$) is received, the counter 118 will be decreased by 1. Both the computation set size counter 118 and the pair of data elements ($101x,101y$) may be accessed or received by component calculation module 131. The pair of data elements ($101x,101y$) must be an existing pair of data elements in the computation set.

Subsequently, a pair of data elements ($102x,102y$) may be received. When this happens, the computation set counter 118 will decrease its value by 1. Both the modified computation set size counter 118 and the pair of data elements ($102x,102y$) may be accessed or received by component calculation module 131. The pair of data elements ($101x$, $101y$) must be an existing pair of data elements in the computation set.

Referring to FIG. 1A, computing system architecture 100A also includes two optional data buffers 125X and 125Y. Optional data buffers 125X and 125Y are useful when combining decremental simple linear regression coefficient calculation with iterative simple linear regression coefficient calculation (presented in a separate patent application "Iterative Simple Linear Regression Coefficient Calculation Using Components" by the present inventor). As data element pairs are accessed or received, they may be removed from two optional data buffers 125X and 125Y as needed (i.e., when combining decremental simple linear regression coefficient calculation with iterative simple linear regression coefficient calculation).

Referring to computing system architecture 100A, decremental component calculation module 131 comprises $v=p\geq 1$) component calculation modules for calculating v components for data elements in the computation set where v varies depending on the decremental algorithm used. As depicted in FIG. 1A, component calculation module 131 comprises component $Cd_1$ calculation module 161 and component $Cd_v$ calculation module 162, and there are v−2 other component calculation modules between them. Calculation module 161 comprises initialization module 132 for initializing component $Cd_1$ and decremental algorithm 133 for directly decrementally calculating component $Cd_1$. Calculation module 162 comprises initialization module 138 for initializing component $Cd_v$ and decremental algorithm 139 for directly decrementally calculating component $Cd_v$. Initialization module 132 is configured to initialize component $Cd_1$ for data elements in the computation set and initialization module 138 is configured to initialize component $Cd_v$ for data elements in the computation set. Component $Cd_1$ 141 is the initial value of component $Cd_1$. Initialization module 132 may be used for an initialization of component $Cd_1$ or when simple linear regression coefficient calculations are reset. Initialization module 132 initializes component $Cd_1$ 141 to be a specific value composed of contribution 151, contribution 152 and contribution 153 passed in by reset module 129 for the non-empty computation set. Similarly, initialization module 138 may be used for an initialization of component $Cd_v$ or when simple linear regression calculations are reset. Component $Cd_v$ 145 is the initial value of component $Cd_v$. Initialization module 138 initializes component $Cd_v$ 145 to be a specific value composed of contribution 181, contribution 182 and contribution 183 passed in by reset module 129 for the non-empty computation set.

Decremental algorithms are also configured to calculate v components for data elements in the computation set. Decremental algorithm 133 accesses or receives a prior component $Cd_1$ value and an existing (e.g., the least recent) pair of data elements to be removed from the computation set as input. Decremental algorithm 133 calculates a component $Cd_1$ for the modified computation set from the prior component $Cd_1$ value and the removed pair of data elements. Contribution removal module 133A may remove any contribution of the removed pair of data elements from the prior component $Cd_1$. Removing any contribution for the removed pair of data elements may be used to calculate component $Cd_1$ for the modified computation set. Decremental algorithm 139 works in a similar way as decremental algorithm 133. Decremental algorithm 139 accesses or receives a prior component $Cd_v$ value and an existing (e.g., the least recent) pair of data elements to be removed from the computation set as input. Decremental algorithm 139 calculates a component $Cd_v$ for the modified computation set from the prior component $Cd_v$ value and the removed pair of data elements. Contribution removal module 139A may remove any contribution of the removed pair of data elements from the prior component $Cd_v$. Removing any contribution of the removed pair of data elements may be used to calculate component $Cd_v$ for the modified computation set.

Referring to FIG. 1A, computing system architecture 100A also includes simple linear regression coefficient calculation module 191 and simple linear regression coefficients b1 192 and b0 193. Once $p(p=v\geq 1)$ components of simple linear regression coefficients are decrementally calculated by component calculation module 131, simple linear regression coefficient calculation module 191 may calculate simple linear regression coefficients b1 192 and b0 193 as needed using one or more decrementally calculated or initialized components.

Figure 1B:
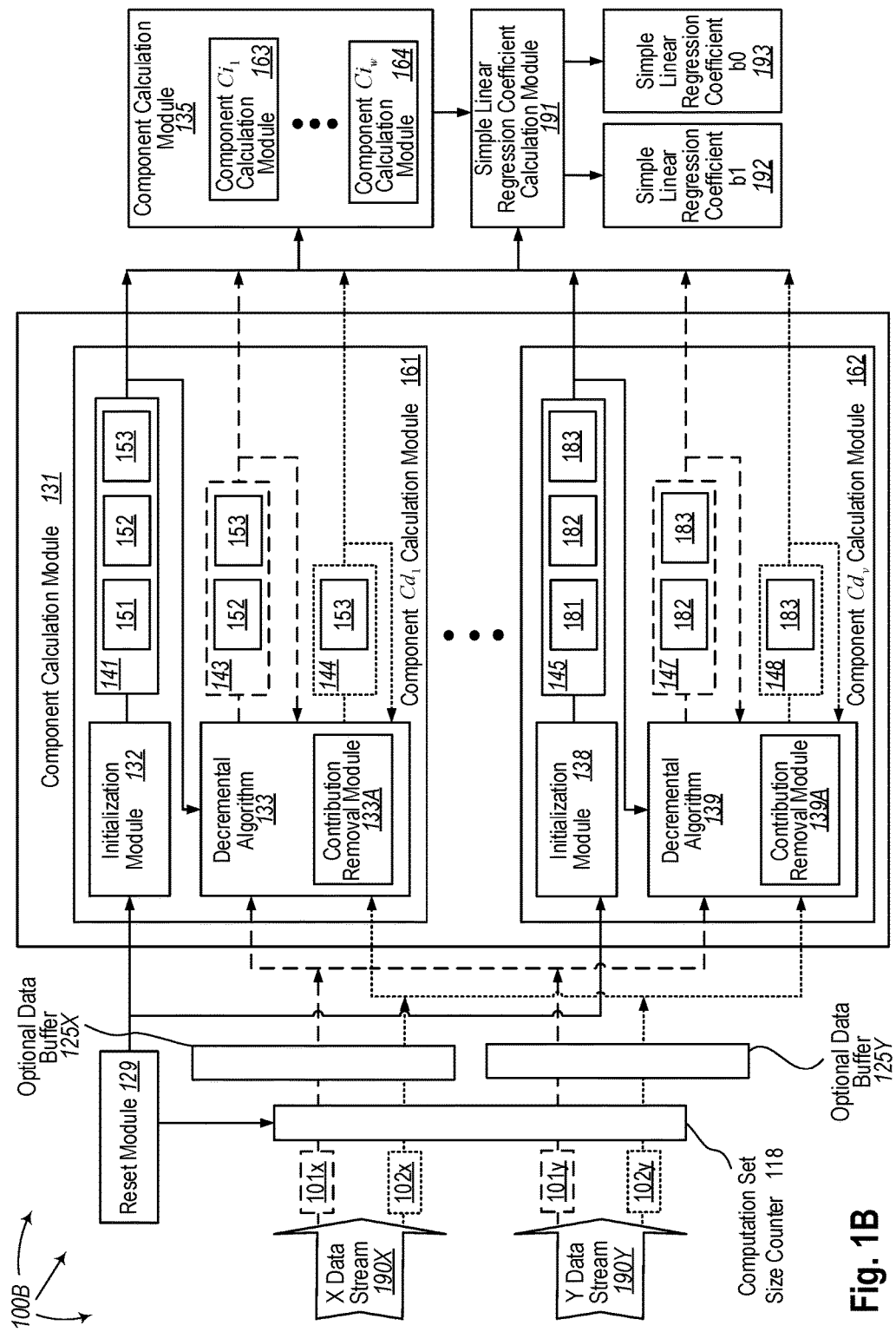
FIG. 1B illustrates an example computing system architecture that facilitates decrementally calculating simple linear regression coefficients for streamed data with two inputs with some components being directly decrementally calculated and some components being indirectly decrementally calculated.

FIG. 1B illustrates an example computing system architecture 100B that facilitates decrementally calculating simple linear regression for Big Data or streamed data with two inputs with some ($v(1\leq v\leq p)$) components being directly decrementally calculated and some ($w=p-v$) components being indirectly decrementally calculated. Number v as well as number w is algorithm dependent. Many parts included in computing system architectures 100B and 100A have same reference numbers. Those parts have similar structures and work in similar ways. In certain implementations, the difference between computing system architectures 100B and 100A may be that architecture 100B includes a component calculation module 135. All parts except component calculation module 135 in 100B work in a similar way as those parts with the same reference numbers in 100A. Instead of repeating what have already been explained in the description about 100A, only the different part is discussed here. Number v in 100B may not be the same number v as in 100A, because some directly decrementally calculated components in 100A are indirectly decrementally calculated in 100B. In 100A, $v=p\geq 1$, but in 100B, $1\leq v\leq p$. Referring to FIG. 1B, computing system architecture 100B includes component calculation module 135. The output of components calculation module 131 may be used as the input of component calculation module 135, and the output of calculation modules 131 and 135 may be used as the input of simple linear regression coefficient calculation module 191, and simple linear regression coefficient calculation module 191 may generate simple linear regression coefficients b1 192 and b0 193. Component calculation module 135 generally includes w=p−v component calculation modules for indirectly decrementally calculating w components. For example, Component calculation module 135 includes calculation module 163 for indirectly decrementally calculating component $Ci_1$ and calculation module 164 for indirectly decrementally calculating component $Ci_w$, and there are w−2 component calculation modules between them. Indirectly decrementally calculating w components includes indirectly decrementally calculating each of the w components one by one. Indirectly decrementally calculating a component includes accessing and using one or more components other than the component itself. The one or more components may have been initialized, directly decrementally calculated or indirectly decrementally calculated.

Referring to computing system architecture 100B, once all p(p=v+w) components have been decrementally calculated, simple linear regression calculation module 191 may be used for calculating simple linear regression coefficients b1 192 and b0 193 as needed based on one or more decrementally calculated or initialized components.

Figure 1C:
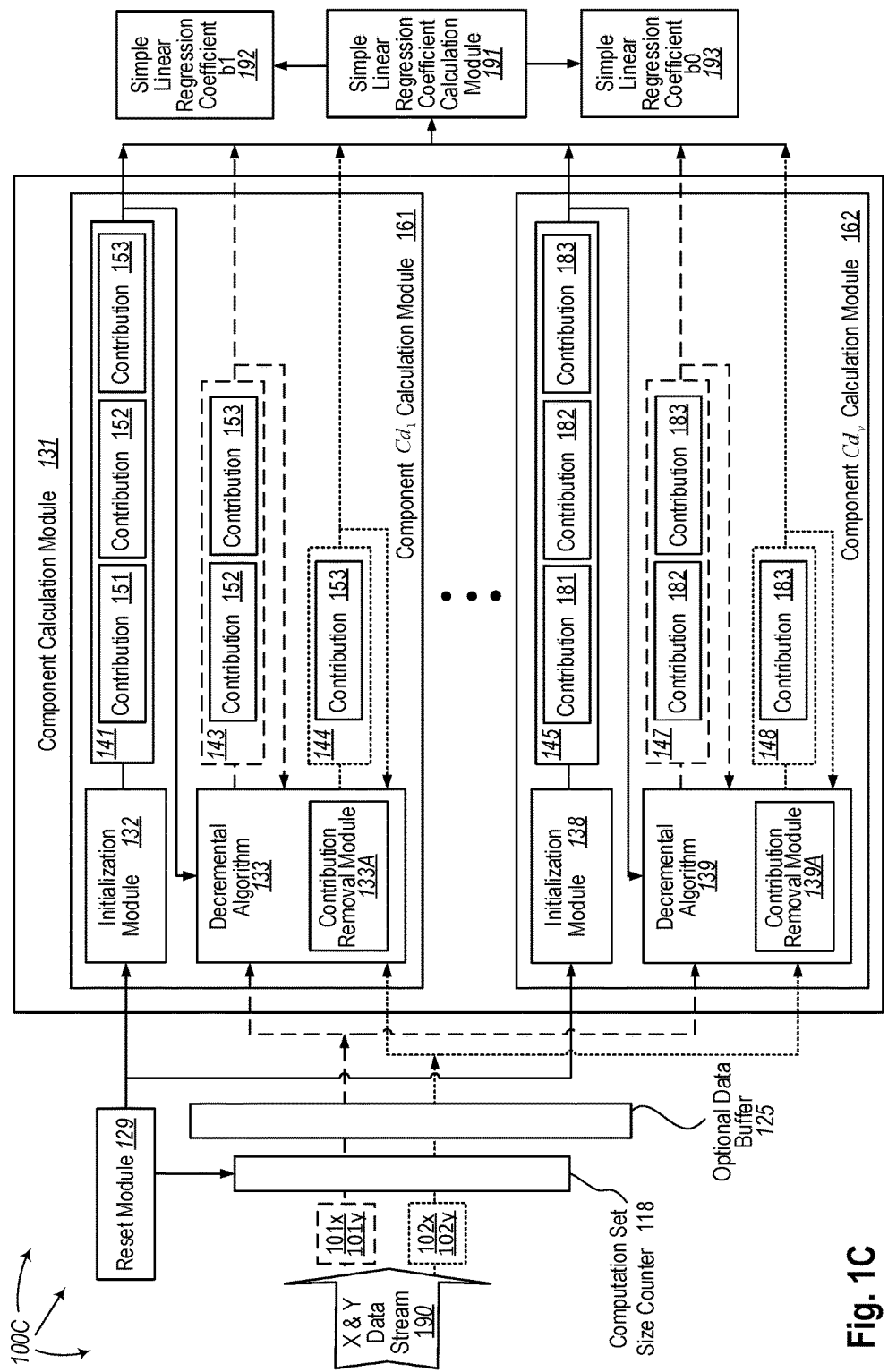
FIG. 1C illustrates an example computing system architecture that facilitates decrementally calculating simple linear regression coefficients for streamed data with a single input where data elements from two data streams are interleaved with all components being directly decrementally calculated.

FIG. 1C illustrates an example computing system architecture 100C that facilitates decrementally calculating simple linear regression coefficients for Big Data or streamed data with a single input where data elements from two Big Data sets or two data streams are interleaved with all (p=v≥1) components being directly decrementally calculated. In certain implementations, the difference between computing system architectures 100C and 100A may be that architecture 100C uses a single stream as input where two sets of data elements are interleaved and 100C uses a single circular buffer for storing data elements in the computation set. All parts except the input mode in 100C work in a similar way as those parts with the same reference numbers in 100A. Instead of repeating what have already been explained in the description about 100A, only the different part is discussed here. Referring to FIG. 1C, data stream 190 comprises two interleaved data streams X and Y. As pairs of streamed data elements are accessed or received, the streamed data elements may be placed in a location within an optional data buffer 125 (when combining decremental simple linear regression coefficient calculation with iterative simple linear regression coefficient calculation).

Referring to FIG. 1C, computing system architecture 100C also includes simple linear regression coefficient calculation module 191 and simple linear regression coefficients b1 192 and b0 193. Once p(p=v≥1) components of simple linear regression coefficients are decrementally calculated by component calculation module 131, simple linear regression coefficient calculation module 191 may calculate simple linear regression coefficients b1 192 and b0 193 as needed using one or more decrementally calculated or initialized components.

Figure 1D:
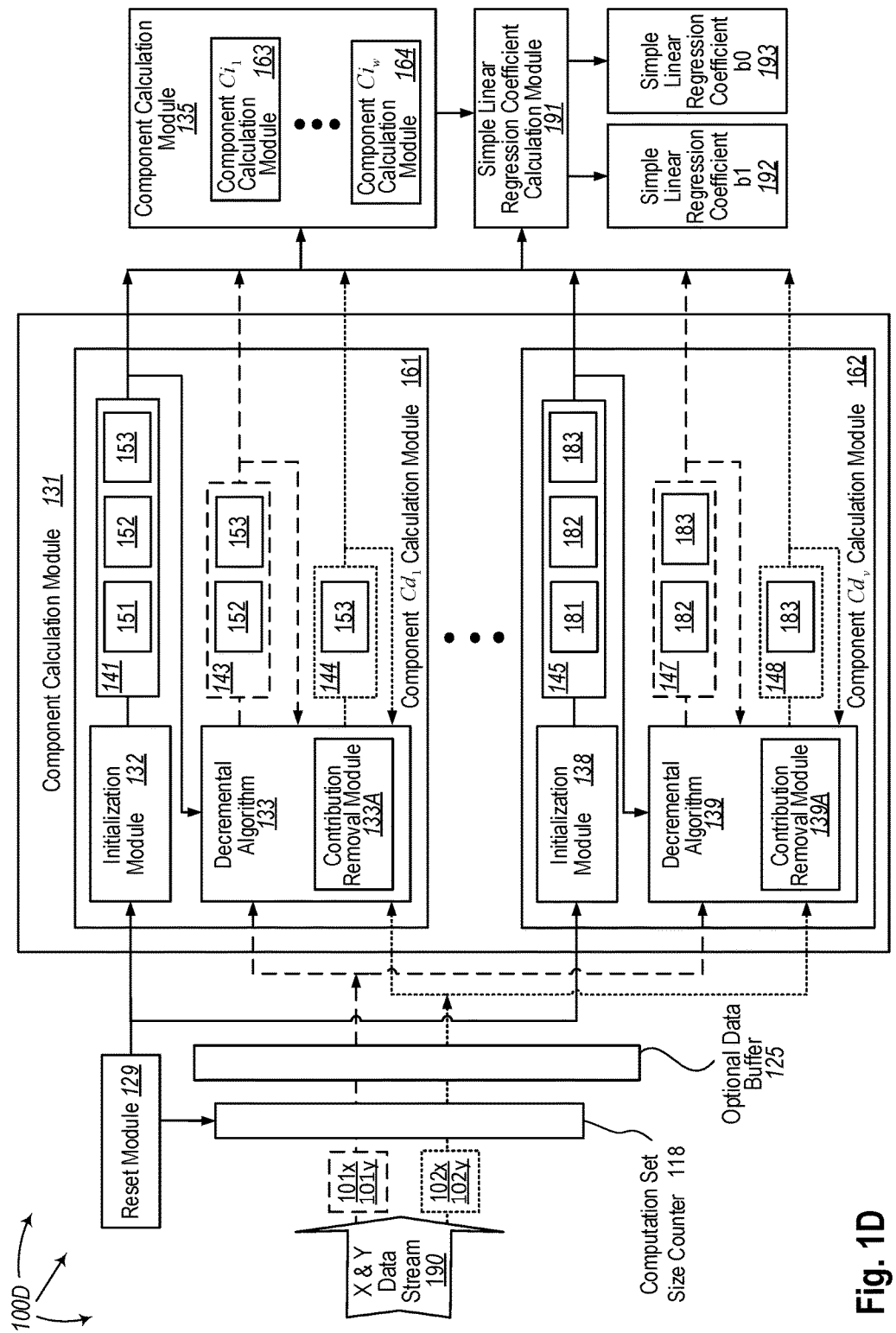
FIG. 1D illustrates an example computing system architecture that facilitates decrementally calculating simple linear regression coefficients for streamed data with a single input where data elements from two data streams are interleaved with some components being directly decrementally calculated and some components being indirectly decrementally calculated.

FIG. 1D illustrates an example computing system architecture 100D that facilitates decrementally calculating simple linear regression coefficients for Big Data or streamed data with a single input where data elements from two Big Data sets or two data streams are interleaved with some (v(1≤v≤p)) components being directly decrementally calculated and some (w(w=p−v)) components being indirectly decrementally calculated. In certain implementations, the difference between computing system architectures 100D and 100C may be that architecture 100D includes a component calculation module 135. All parts except component calculation module 135 in 100D work in a similar way as those parts with the same reference numbers in 100A and 100C. Instead of repeating what have already been explained in the descriptions about 100A and 100C respectively, only the different part is discussed here. Number v in 100D may not be the same as in 100C, because some directly decrementally calculated components in 100C are indirectly decrementally calculated in 100D. In 100C, v=p≥1, but in 100D, 1≤v≤p. Referring to FIG. 1D, computing system architecture 100D includes component calculation module 135. The output of components calculation module 131 may be used as the input of component calculation module 135, and the output of calculation modules 131 and 135 may be used as the input of simple linear regression coefficient calculation module 191, and simple linear regression coefficient calculation module 191 may generate simple linear regression coefficients b1 192 and b0 193. Component calculation module 135 includes w=p−v component calculation modules for indirectly decrementally calculating w components. Indirectly decrementally calculating w components includes indirectly decrementally calculating each of the w components one by one. Indirectly decrementally calculating a component includes accessing and using one or more components other than the component itself. The one or more components may have been initialized, directly decrementally calculated or indirectly decrementally calculated.

Referring to computing system architecture 100D, once all p(p=v+w) components have been decrementally calculated, simple linear regression coefficient calculation module 191 may be used for calculating simple linear regression coefficients b1 192 and b0 193 as needed based on one or more decrementally calculated or initialized components.

Figure 1E:
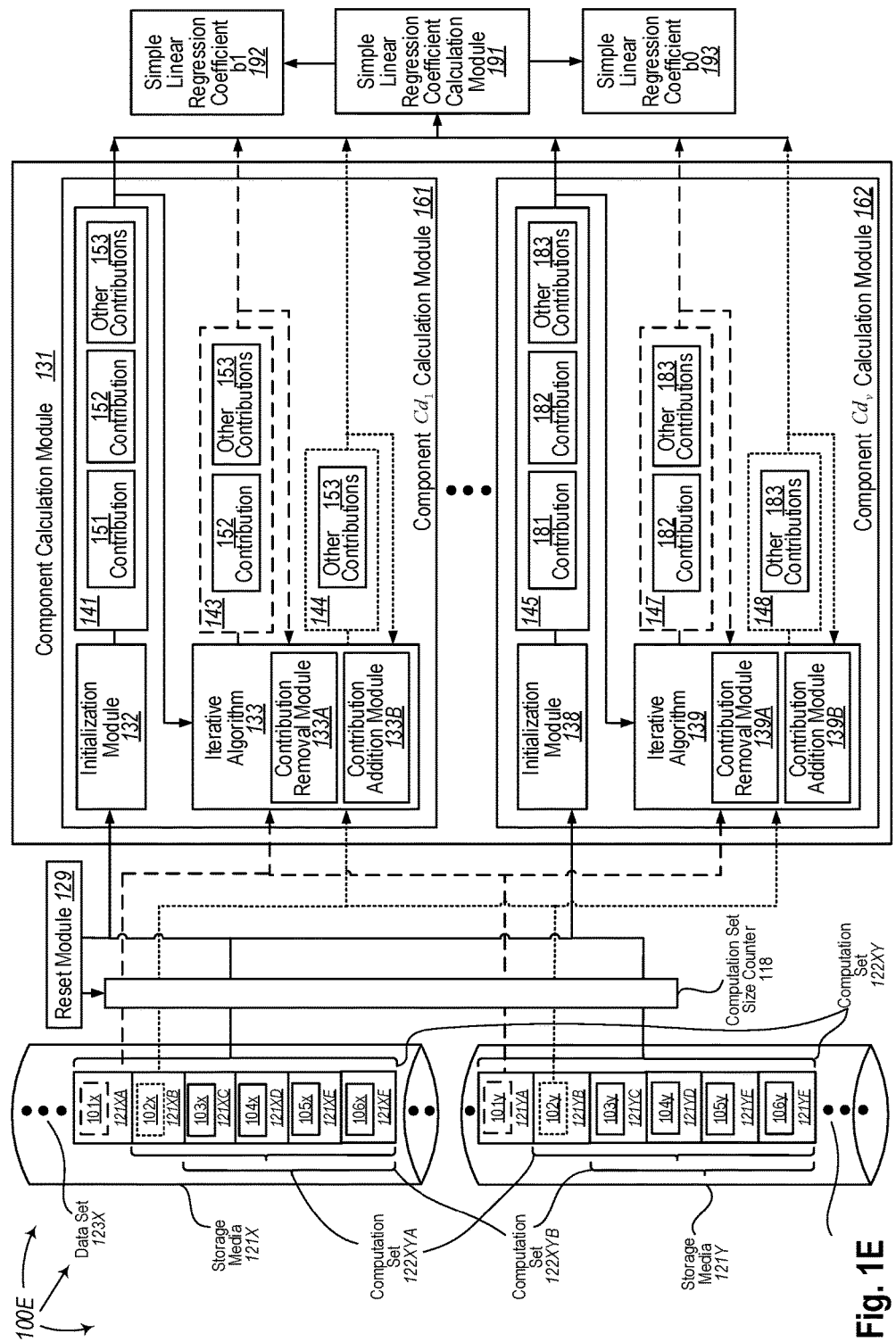
FIG. 1E illustrates an example computing system architecture that facilitates decrementally calculating simple linear regression coefficients for Big Data with two inputs with all components being directly decrementally calculated.

FIG. 1E illustrates an example computing system architecture 100E that facilitates decrementally calculating simple linear regression coefficients for Big Data with two inputs with all components being directly decrementally calculated. The difference between FIG. 1E and FIG. 1A may be that input data elements are accessed from one or two storage media instead of one or two data streams. Referring to FIG. 1E, computing system architecture 100E includes decremental component calculation module 131, simple linear regression coefficient calculation module 191 and simple linear regression coefficients $b_1$ 192 and $b_0$ 193. Decremental component calculation module 131 may be tightly coupled with one or more storage media by a high-speed data bus or loosely coupled with one or more storage media managed by a storage system via (or is part of) a network, such as, for example, a Local Area Network ("LAN"), a Wide Area Network ("WAN"), and even the Internet. The output of component calculation module 131 will be used as the input of simple linear regression coefficient calculation module 191, and simple linear regression coefficient calculation module 191 will generate simple linear regression coefficients $b_1$ 192 and $b_0$ 193.

Storage media 121X comprises a data set 123X, and storage media 121Y comprises a data set 123Y. As depicted, data set 123X comprises multiple data elements stored in multiple locations of storage media 121X. For example, data elements 101x, 102x, 103x, 104x, 105x and 106x are stored in locations 121XA, 121XB, 121XC, 121XD, 121XE and 121XF of storage media 121X respectively, and there are multiple other data elements stored in other locations of storage media 121X. Similarly, data set 123Y comprises multiple data elements stored in multiple locations of storage media 121Y. For example, data elements 101y, 102y, 103y, 104y, 105y and 106y are stored in locations 121YA, 121YB, 121YC, 121YD, 121YE and 121YF of storage media 121Y respectively, and there are multiple other data elements stored in other locations of storage media 121Y.

Computation set 122XY, a non-empty computation set of data set 123X and 123Y, contains multiple pairs of data elements from the two data sets with each pair containing one data element from each data sets. For example computation set 122XY includes (101x, 101y), (102x, 102y), (103x, 103y), (104x, 104y), (105x, 105y) and (106x, 106y) of data sets 123X and 123Y.

Computation set size counter 118 is the same as in FIG. 1A, but just that whenever accessing a pair of data elements from the storage media, the computing system modifies the computation set by removing the pair of data elements from the computation set and modifies the computation set size counter 118 by decreasing its content or value by 1. Computation set size counter 118 may be accessed or received by component calculation module 131, and it may be set to a specific value by reset module 129 when decremental simple linear regression coefficient calculation starts working on a non-empty computation set. For example, in 100E, before accessing a pair of data elements (101x, 101y), computation set 122XY contains 6 pairs of data elements, so computation set size counter 118 may be initialized to 6. When a pair of data elements (101x, 101y) is accessed from locations (121XA, 121YA), (101x, 101y) is removed from computation set 122XY, and computation set 122XY becomes computation set 122XYA, and computation set size counter 118 is decreased by 1. Both computation set size counter 118 and data element (101x, 101y) may be accessed or received by component calculation module 131.

Subsequently, a pair of data elements (102x, 102y) may be accessed from locations (121XB, 121YB). (102x, 102y) may be removed from computation set 122XYA, and computation set 122XYA may become computation set 122XYB. Computation set size counter 118 will be decreased by 1. Both the modified computation set size counter 118 and the pair of data elements (102x, 102y) may be accessed or received by component calculation module 131.

Decremental simple linear regression coefficient calculation starts from an existing non-empty computation set where a computation set size and one or more components of simple linear regression coefficients for the computation set may have already been initialized or calculated. If not, the computation set size may be initialized with the number of pairs of data elements in the computation set, and one or more components may be initialized based on their definitions using the data elements in the computation set. For example, in computing system architecture 100E, components ranging from $Cd_1$ 141 to $Cd_v$ 145 may have been initialized. As depicted in FIG. 1E, component $Cd_1$ 141 includes contribution 151 (a contribution from a pair of data elements (101x, 101y)), contribution 152 (a contribution from a pair of data elements (102x, 102y)), and contribution 153 (contributions from other data elements). Similarly, component $Cd_v$ 145 includes contribution 181 (a contribution from a pair of data elements (101x, 101y)) and contribution 182 (a contribution from a pair of data elements (102x, 102y)), and contribution 183 (contributions from other data elements).

Referring to computing system architecture 100E, decremental component calculation module 131 comprises v(v=p≥1) component calculation modules for calculating v components for data elements in the computation set where number v varies depending on the decremental algorithm chosen. As depicted in FIG. 1E, component calculation module 131 comprises component $Cd_1$ calculation module 161 and component $Cd_v$ calculation module 162, and there are v−2 other component calculation modules between them. Calculation module 161 comprises initialization module 132 for initializing component $Cd_1$ and decremental algorithm 133 for directly decrementally calculating component $Cd_1$. Calculation module 162 comprises initialization module 138 for initializing component $Cd_v$ and decremental algorithm 139 for directly decrementally calculating component $Cd_v$. Initialization module 132 is configured to initialize component $Cd_1$ for data elements in two computation sets. Initialization module 138 is configured to initialize component $Cd_v$ for data elements in two computation sets. Component $Cd_1$ 141 is the initial value of component $Cd_1$. Initialization module 132 may be used for an initialization of component $Cd_1$ or when simple linear regression coefficient calculations are reset. Initialization module 132 initializes component $Cd_1$ 141 to be a specific value composed of contribution 151, contribution 152 and contribution 153 passed in by reset module 129 for two non-empty computation sets. Similarly, initialization module 138 may be used for an initialization of component $Cd_v$ or when simple linear regression coefficient calculations are reset. Component $Cd_v$ 145 is the initial value of component $Cd_v$. Initialization module 138 initializes component $Cd_v$ 145 to be a specific value composed of contribution 181, contribution 182 and contribution 183 passed in by reset module 129 for two non-empty computation sets.

Decremental algorithms are also configured to calculate v components for data elements in the computation set. Decremental algorithm 133 receives a prior component $Cd_1$ value and a pair of data elements removed from the computation set as input. Decremental algorithm 133 calculates a component $Cd_1$ for the modified computation set based on the prior component $Cd_1$ value and the removed pair of data elements. Contribution removal module 133A may remove any contribution for the removed pair of data elements from the prior component $Cd_1$. Removing any contribution for the removed pair of data elements may be used to calculate component $Cd_1$ for the two modified computation sets. Decremental algorithm 139 works in a similar way as decremental algorithm 133. Decremental algorithm 139 receives a prior component $Cd_v$ value and a pair of data elements removed from the computation set as input. Decremental algorithm 139 calculates a component $Cd_v$ for the modified computation set based on the prior component $Cd_v$ value and the removed pair of data elements. Contribution removal module 139A may remove any contribution for the removed pair of data elements from the prior component $Cd_v$. Removing any contribution for the removed pair of data elements may be used to calculate component $Cd_v$ for the modified computation set.

Referring to FIG. 1E, computing system architecture 100E also includes simple linear regression coefficient calculation module 191 and simple linear regression coefficients b1 192 and b0 193. Once p(p=v≥1) components of simple linear regression coefficients are decrementally calculated by component calculation module 131, simple linear regression coefficient calculation module 191 may calculate simple linear regression coefficients b1 192 and b0 193 as needed using one or more decrementally calculated or initialized components.

Figure 1F:
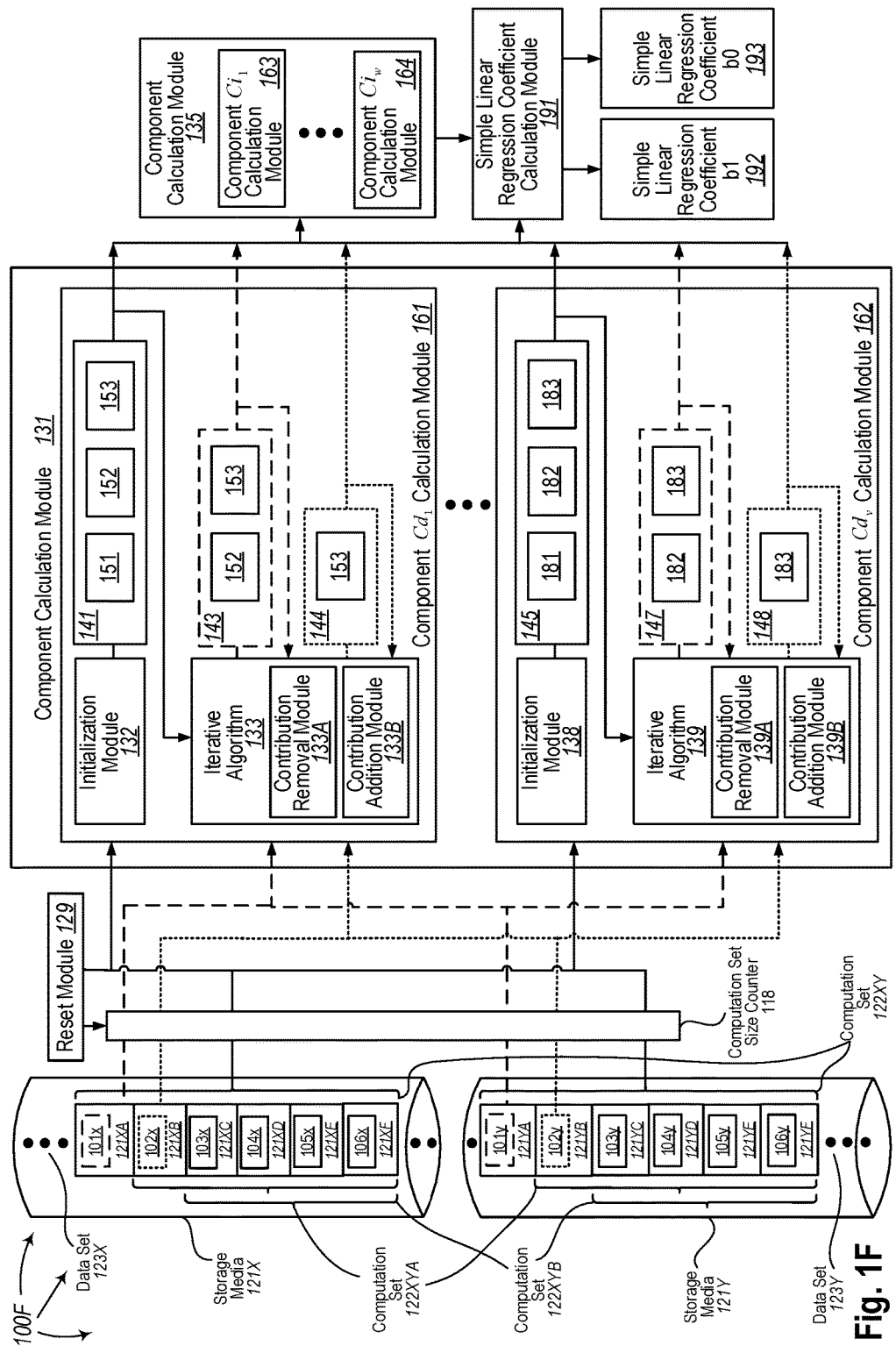
FIG. 1F illustrates an example computing system architecture that facilitates decrementally calculating simple linear regression coefficients for Big Data with two inputs with some components being directly decrementally calculated and some components being indirectly decrementally calculated.

FIG. 1F illustrates an example computing system architecture 100F that facilitates decrementally calculating simple linear regression coefficients for Big Data with two inputs with some (v(1≤v≤p)) components being directly decrementally calculated and some (w=p−v) components being indirectly decrementally calculated. Number v and number w are algorithm dependent. Many parts included in computing system architectures 100F and 100E have same reference numbers. Those parts have similar structures and work in similar ways. In certain implementations, the difference between computing device system architectures 100F and 100E may be that architecture 100F includes a component calculation module 135. All parts except component calculation module 135 in 100F work in a similar way as those parts with the same reference numbers in 100E. Instead of repeating what have already been explained in the description about 100E, only the different part is discussed here. The number v in 100F may not be the same number v as in 100E, because some directly decrementally calculated components in 100E are indirectly decrementally calculated in 100F. In 100E, $v=p\geq1$, but in 100F, $1\leq v\leq p$. Referring to FIG. 1F, computing system architecture 100F includes component calculation module 135. The output of components calculation module 131 may be used as the input of component calculation module 135, and the output of calculation modules 131 and 135 may be used as the input of simple linear regression coefficient calculation module 191, and simple linear regression coefficient calculation module 191 may generate simple linear regression coefficients b1 192 and b0 193. Component calculation module 135 generally includes $w=p-v$ component calculation modules for indirectly decrementally calculating w components. For example, component calculation module 135 includes calculation module 163 for indirectly decrementally calculating component $Ci_1$ and calculation module 164 for indirectly decrementally calculating component $Ci_w$, and there are $w-2$ component calculation modules in between. Indirectly decrementally calculating w components includes indirectly decrementally calculating each of the w components one by one. Indirectly decrementally calculating a component includes accessing and using one or more components other than the component itself. The one or more components could be initialized, directly decrementally calculated or indirectly decrementally calculated.

Referring to computing system architecture 100F, once all $p(p=v+w)$ components have been decrementally calculated, simple linear regression coefficient calculation module 191 may be used for calculating simple linear regression coefficient b1 192 and b0 193 as needed based on one or more decrementally calculated or initialized components.

Figure 1G:
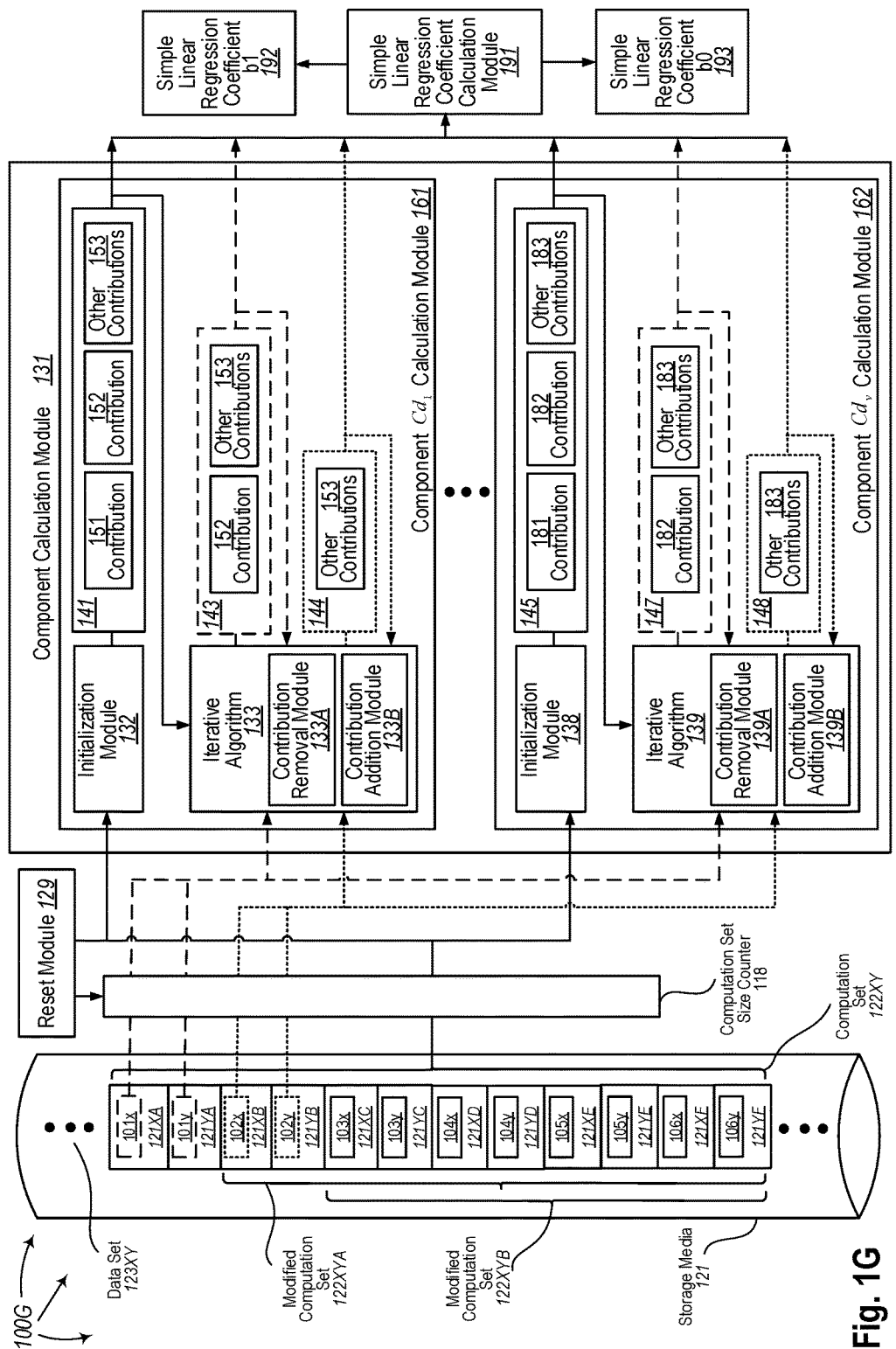
FIG. 1G illustrates another example computing system architecture that facilitates decrementally calculating simple linear regression coefficients for Big Data with a single input where data elements from two Big Data sets are interleaved with all components being directly decrementally calculated.

FIG. 1G illustrates an example computing system architecture 100G that facilitates decrementally calculating simple linear regression coefficients for Big Data with a single input where data elements from two Big Data sets are interleaved with all $(p=v\geq1)$ components being directly decrementally calculated. In certain implementations, the difference between computing system architectures 100G and 100E may be that architecture 100G uses a single input where two sets of data elements are interleaved. All parts except the input mode in 100G work in a similar way as those parts with the same reference numbers in 100E. Instead of repeating what have already been explained in the description about 100E, only the different part is discussed here. Referring to FIG. 1G, there is a storage media 121. Storage media 121 includes a data set 123XY where data elements from data set X and data set Y are interleaved, i.e., data elements are placed alternatively. As pairs of data elements are accessed, the data elements are accessed from locations that may be next to each other. For example, a pair of data elements (101x, 101y), (102x, 102y), (103x, 103y), (104x, 104y), (105x, 105y) or (106x, 106y) may be accessed from locations (121XA, 121YA), (121XB, 121YB), (121XC, 121YC), (121XD, 121YD), (121XE, 121YE) or (121XF, 121YF) respectively where their locations are next to each other. Computation set 122XY contains 6 pairs of data elements: (101x, 101y), (102x, 102y), (103x, 103y), (104x, 104y), (105x, 105y) and (106x, 106y). The computing system may use data elements in computation set 122XY for initializing one or more components of simple linear regression coefficients.

Next, a pair of data elements (101x, 101y) to be removed from computation set 122XY may be accessed. Data elements (101x, 101y) may be accessed or received from locations (121XA, 121YA). After (101x, 101y) is removed from computation set 122XY, computation set 122XY may become modified computation set 122XYA, and computation set size counter 118 is decreased by 1. The computing system may decrementally calculate simple linear regression coefficients for modified computation set 122XYA.

Subsequently, a pair of data elements (102x, 102y) to be removed from modified computation set 122XYA may be accessed. Data elements (102x, 102y) may be accessed or received from locations (121XB, 121YB). After (102x, 102y) is removed from modified computation set 122XYA, modified computation set 122XYA may become modified computation set 122XYB, and computation set size counter 118 will be decreased by 1. The computing system may decrementally calculate simple linear regression coefficients for modified computation set 122XYB.

Referring to FIG. 1G, computing system architecture 100G also includes simple linear regression coefficient calculation module 191 and simple linear regression coefficients b1 192 and b0 193. Once $p(p=v\geq1)$ components of simple linear regression coefficients are decrementally calculated by component calculation module 131, simple linear regression coefficient calculation module 191 may calculate the simple linear regression coefficients b1 192 and b0 193 as needed using one or more decrementally calculated or initialized components.

Figure 1H:
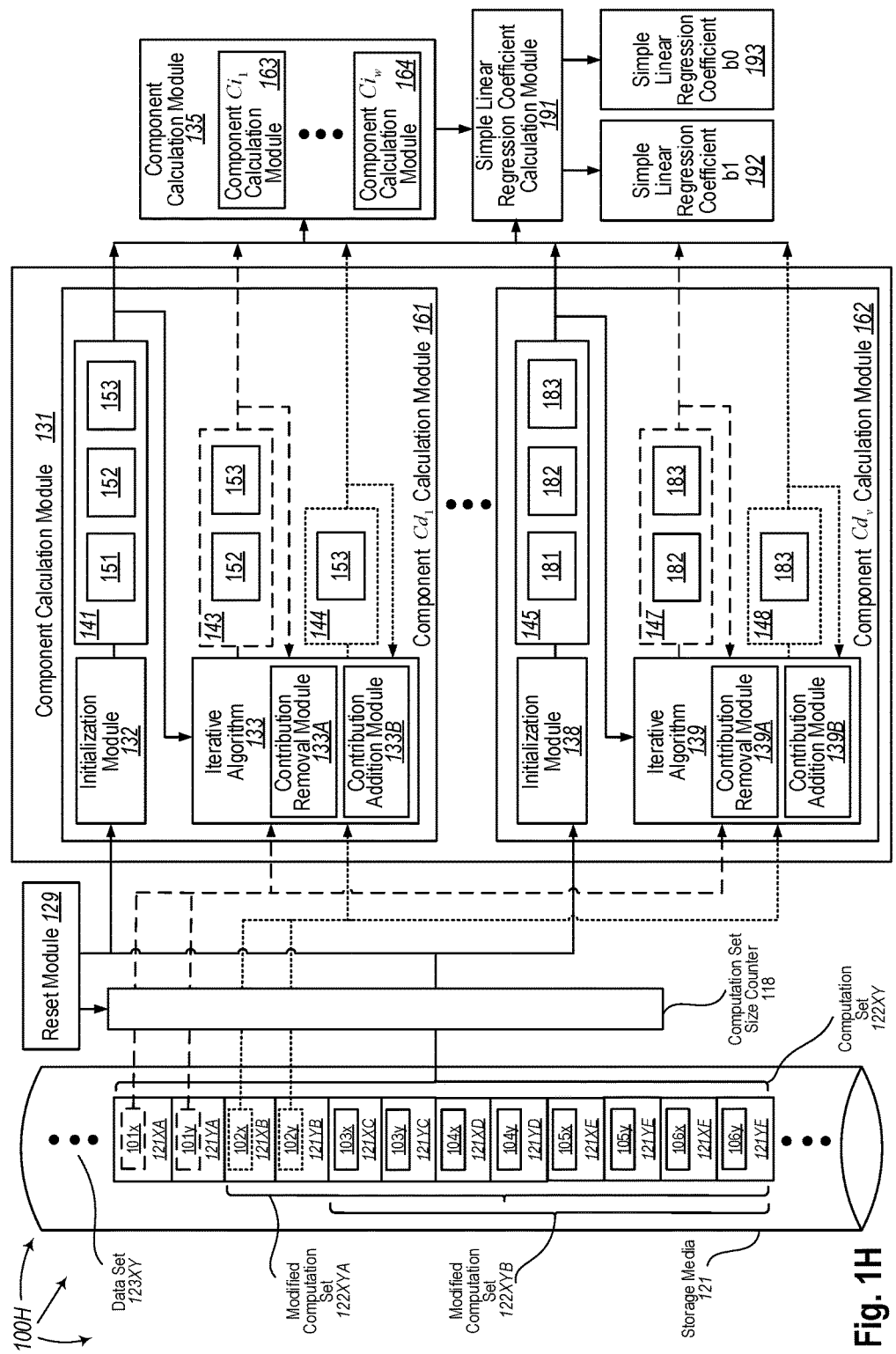
FIG. 1H illustrates another example computing system architecture that facilitates decrementally calculating simple linear regression coefficients for Big Data with a single input where data elements from two Big Data sets are interleaved with some components being directly decrementally calculated and some components being indirectly decrementally calculated.

FIG. 1H illustrates an example computing system architecture 100H that facilitates decrementally calculating simple linear regression coefficients for Big Data with a single input where data elements from two Big Data sets are interleaved with some $(v(1\leq v\leq p))$ components being directly decrementally calculated and some $(w(w=p-v))$ components being indirectly decrementally calculated. In certain implementations, the difference between computing system architectures 100H and 100G may be that architecture 100H includes a component calculation module 135. All parts except component calculation module 135 in 100H work in a similar way as those parts with the same reference numbers in 100E and 100G. Instead of repeating what have already been explained in the descriptions about 100E and 100G respectively, only the different part is discussed here. Computing system architecture 100H also includes component calculation module 131, which also includes v component calculation modules for directly decrementally calculating v components, however the number v in 100H may not be the same number v as in 100G, because some directly decrementally calculated components in 100G are indirectly decrementally calculated in 100H. In 100G, $v=p\geq1$, but in 100H, $1\leq v\leq p$. Referring to FIG. 1H, computing system architecture 100H includes component calculation module 135. Component calculation module 135 includes $w=p-v$ component calculation modules for indirectly decrementally calculating w components. Indirectly decrementally calculating w components includes indirectly decrementally calculating each of the w components one by one. Indirectly decrementally calculating a component includes accessing and using one or more components other than the component itself. The one or more components could be initialized, directly decrementally calculated or indirectly decrementally calculated.

Referring to computing system architecture 100H, once all p(p=v+w) components have been decrementally calculated, simple linear regression coefficient calculation module 191 may be used for calculating simple linear regression coefficients b1 192 and b0 193 as needed based on one or more decrementally calculated or initialized components.

Figure 2:
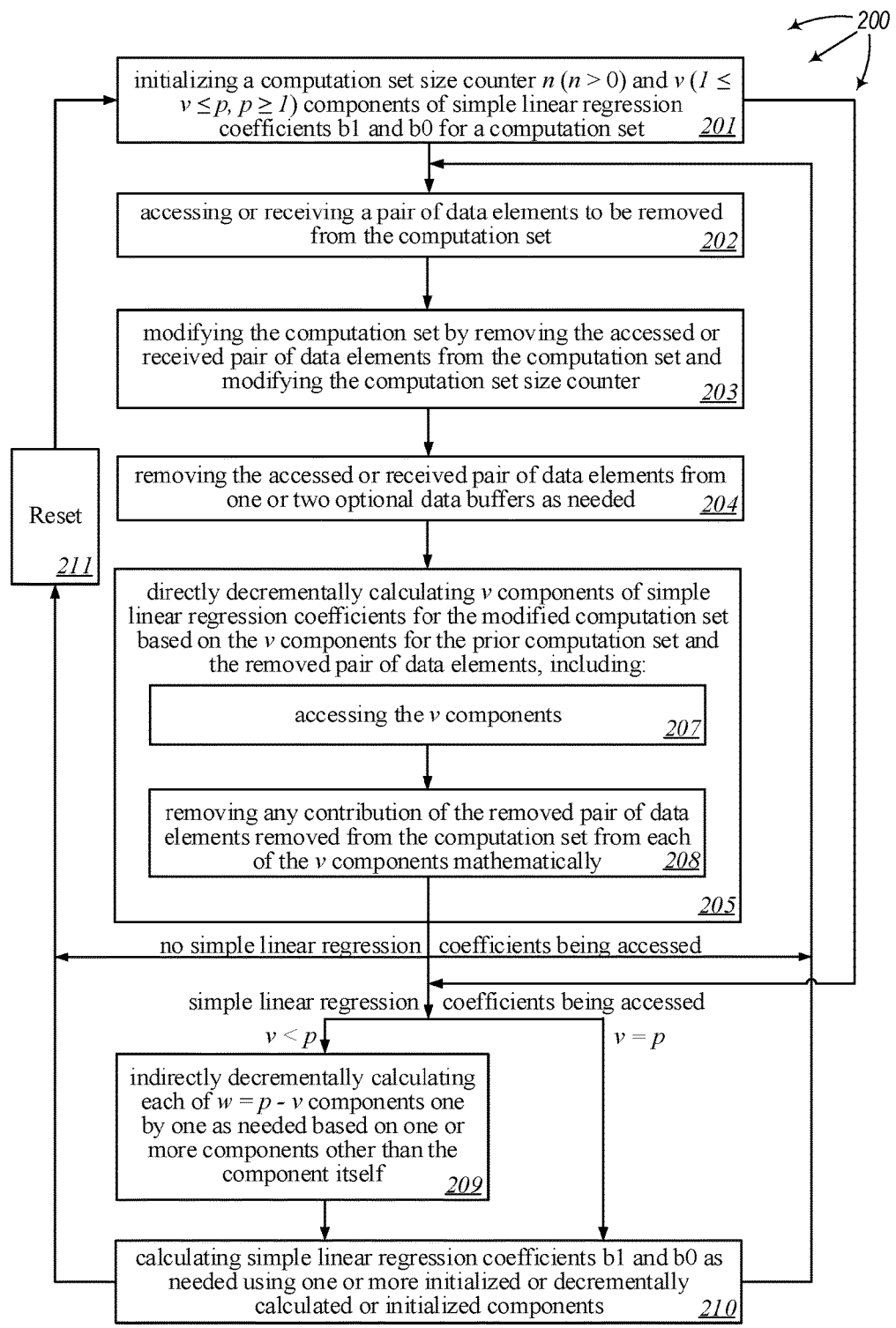
FIG. 2 illustrates a flow chart of an example method for decrementally calculating simple linear regression coefficients for Big Data or streamed data.

FIG. 2 illustrates a flow chart of an example method 300 for decrementally calculating simple linear regression coefficients for Big Data or streamed data. Method 200 will be described with respect to the components and data of computing system architectures 100A, 100B, 100C, 100D, 100E, 100F, 100G and 100H respectively.

Method 200 includes initializing a computation set size counter 118 and v($1 \leq v \leq p$, $p \geq 1$) components of simple linear regression coefficients b1 and b0 for a computation set of size n(n>0) (201). For example, reset module 129 may set initial values for components ranging from component $Cd_1$ to component $Cd_v$ which may be accessed by initialization modules 132 and 138 respectively and may set a corresponding initial value for computation set size counter 118. Initialization module 132 may access the initial value for component $Cd_1$ and initialize component $Cd_1$ 141 with the value which includes contribution 151 (contribution from the pair of data elements (101x, 101y)), contribution 152 (contribution from the pair of data elements (102x, 102y) and contribution 153 (contribution from other pairs of data elements (103x, 103y), (104x, 104y), . . . ). Similarly, initialization module 138 may access the initial value for component $Cd_v$ and initialize component $Cd_1$ 145 with the value which includes contribution 181 (contribution from the pair of data elements (101x, 101y)), contribution 182 (contribution from the pair of data elements (102x, 102y)) and contribution 183 (contribution from other pairs of data elements (103x, 103y), (104x, 104y), . . . ).

Method 200 includes accessing or receiving a pair of data elements to be removed from the non-empty computation set (202). For example, a pair of data elements (101x, 101y) may be accessed or received. Method 200 includes modifying the computation set by removing the accessed or received pair of data elements from the computation set and modifying the computation set size counter by decreasing its current value by one (203). For example, data element pair (101x, 101y) is removed from computation set XY and computation set size counter 118 is modified by decreasing its current value by 1 upon accessing or receiving the pair of data elements (101x, 101y). The computation set before the modification becomes a prior computation set.

Method 200 includes removing the accessed or received pair of data elements from two optional data buffers as needed (204). For example, when combining decremental simple linear regression coefficient calculation with iterative simple linear regression coefficient calculation, data element 101x may be removed from an optional data buffer 125X and data element 101y may be removed from an optional data buffer 125Y as needed.

Method 200 includes directly decrementally calculating v($1 \leq v \leq p$) components of simple linear regression coefficients for the modified computation set based on the v components for the prior computation set and the removed pair of data elements (205). For example, algorithm 133 may be used for directly decrementally calculating component $Cd_1$ 143 based on component $Cd_1$ 141 and the pair of data elements (101x, 101y), and algorithm 139 may be used for directly decrementally calculating component $Cd_v$ 147 based on component $Cd_v$ 145 and the pair of data elements (101x, 101y).

Directly decrementally calculating v components of simple linear regression coefficients for the modified computation set includes accessing the v components of the simple linear regression coefficients for the prior computation set (207). For example, decremental algorithm 133 may access component $Cd_1$ 141, and decremental algorithm 139 may access component $Cd_v$ 145.

Directly decrementally calculating v components of simple linear regression coefficients for the modified computation set includes removing any contribution of the removed pair of data elements from each of the v components mathematically (208). For example, decrementally calculating component $Cd_1$ 143 may include contribution removal module 133A removing contribution 151 from component 141 mathematically, and decrementally calculating component $Cd_v$ 147 may include contribution removal module 139A removing contribution 181 from component $Cd_v$ 145 mathematically. Contribution 151 and 181 are contributions of the pair of data elements (101x, 101y).

As depicted in FIG. 1A, component $Cd_1$ 143 includes contribution 152 and contribution 153, and component $Cd_1$ 147 includes contribution 182 and contribution 183. Contribution 152 is a contribution from the pair of data elements (102x, 102y). Contribution 153 is a contribution from the pairs of data elements (103x, 103y), (104x,104y), . . . . Contribution 182 is a contribution from the pair of data elements (102x, 102y). Contribution 183 is a contribution from the pairs of data elements (103x, 103y), (104x, 104y), . . . .

Besides directly decrementally calculated components, some components may be indirectly decrementally calculated. Method 200 includes indirectly decrementally calculating each of w=p-v components one by one as needed based on one or more components other than the component itself (209) when v<p, i.e., not all components are directly decrementally calculated. Since the w indirectly decrementally calculated components are calculated using other components, they might not need to be initialized. In addition, the w indirectly decrementally calculated components might not need to be calculated in every iteration (i.e., a pair of existing data elements removed from the computation set). They only need to be calculated when simple linear regression coefficients are accessed. For example, referring to FIG. 1B where some components are directly decrementally calculated and some are indirectly decrementally calculated, calculation module 163 may indirectly decrementally calculate $Ci_1$ based on one or more components other than $Ci_1$, and the one or more components may have been initialized, directly decrementally calculated or indirectly decrementally calculated. Similarly, calculation module 164 may indirectly decrementally calculate $Ci_w$ based on one or more components other than $Ci_w$, and the one or more components may have been initialized, directly decrementally calculated or indirectly decrementally calculated. For a directly decrementally calculated component, it must be calculated in every iteration. For example, referring to FIG. 4C, in Decremental Algorithm 1, component $SXY_{k+1}$ for the k+1$^{th}$ iteration is directly decrementally calculated based on component $SXY_k$ for the k$^{th}$ iteration, so it must be calculated in every iteration. However, components $b1_{k+1}$ and $b0_{k+1}$ are indirectly decrementally calculated based on other components, so $b1_{k+1}$ and $b0_{k+1}$ only need to be calculated when they are accessed.

Method 200 includes calculating simple linear regression coefficients using one or more decrementally calculated components of the simple linear regression coefficients (210). The one or more components may all be directly decrementally calculated (v=p) (205) or partially be directly decrementally calculated and partially be indirectly decrementally calculated (v<p) (209). For example, calculation module 191 may calculate simple linear regression coefficients b1 192 and b0 193 using initialized components $Cd_1$ 141 and component $Cd_v$ 145. And, calculation module 191 may calculate simple linear regression coefficients b1 192 and b0 193 using decrementally calculated component $Cd_1$ 143 and component $Cd_v$ 147.

202-208 may be repeated as pairs of data elements to be removed are accessed or received. 209-210 may be repeated as needed. For example, subsequent to calculating components ranging from $Cd_1$ 143 to $Cd_v$ 147, next pair of data elements (102x, 102y) to be removed may be accessed or received.

Decremental algorithm 133 may be used for directly decrementally calculating component $Cd_1$ 144 based on component $Cd_1$ 143. Decremental algorithm 133 may access component $Cd_1$ 143. Directly decrementally calculating component $Cd_1$ 144 may include contribution removal module 133A removing contribution 152 from component $Cd_1$ 143 mathematically. Contribution 152 is a contribution from the pair of data elements (102x, 102y). Similarly, decremental algorithm 139 may be used for directly decrementally calculating component $Cd_v$ 148 based on component $Cd_v$ 147. Decremental algorithm 139 may access component $Cd_v$ 147. Directly decrementally calculating component $Cd_v$ 148 may include contribution removal module 139A removing contribution 182 from component $Cd_v$ 147 mathematically. Contribution 182 is a contribution from the pair of data elements (102x, 102y). As depicted, component $Cd_1$ 144 includes contribution 153 (a contribution from the pairs of data elements (103x, 103y), (104x, 104y), . . . ), and component $Cd_v$ 148 includes contribution 183 (a contribution from the pairs of data elements (103x, 103y), (104x, 104y), . . . ). When further pair of data elements are accessed or received, component $Cd_1$ 144 may be used for directly decrementally calculating component $Cd_1$ for the modified computation set and component $Cd_v$ 148 may be used for directly decrementally calculating component $Cd_v$ for the modified computation set.

As depicted in FIG. 2, reset 211 may be used for resetting decremental simple linear regression coefficient calculation. When reset 211 is invoked either after 205 or 210, the computation set size counter and v components of simple linear regression coefficients will be reset or initialized. For example, component $Cd_1$ 141 may be initialized with a specific value that has already been calculated for the non-empty computation set. Such case may happen when combining decremental simple linear regression coefficient calculation with iterative simple linear regression coefficient calculation or incremental simple linear regression coefficient calculation. Component $Cd_v$ 145 may be initialized in the same way.

Figure 3A:
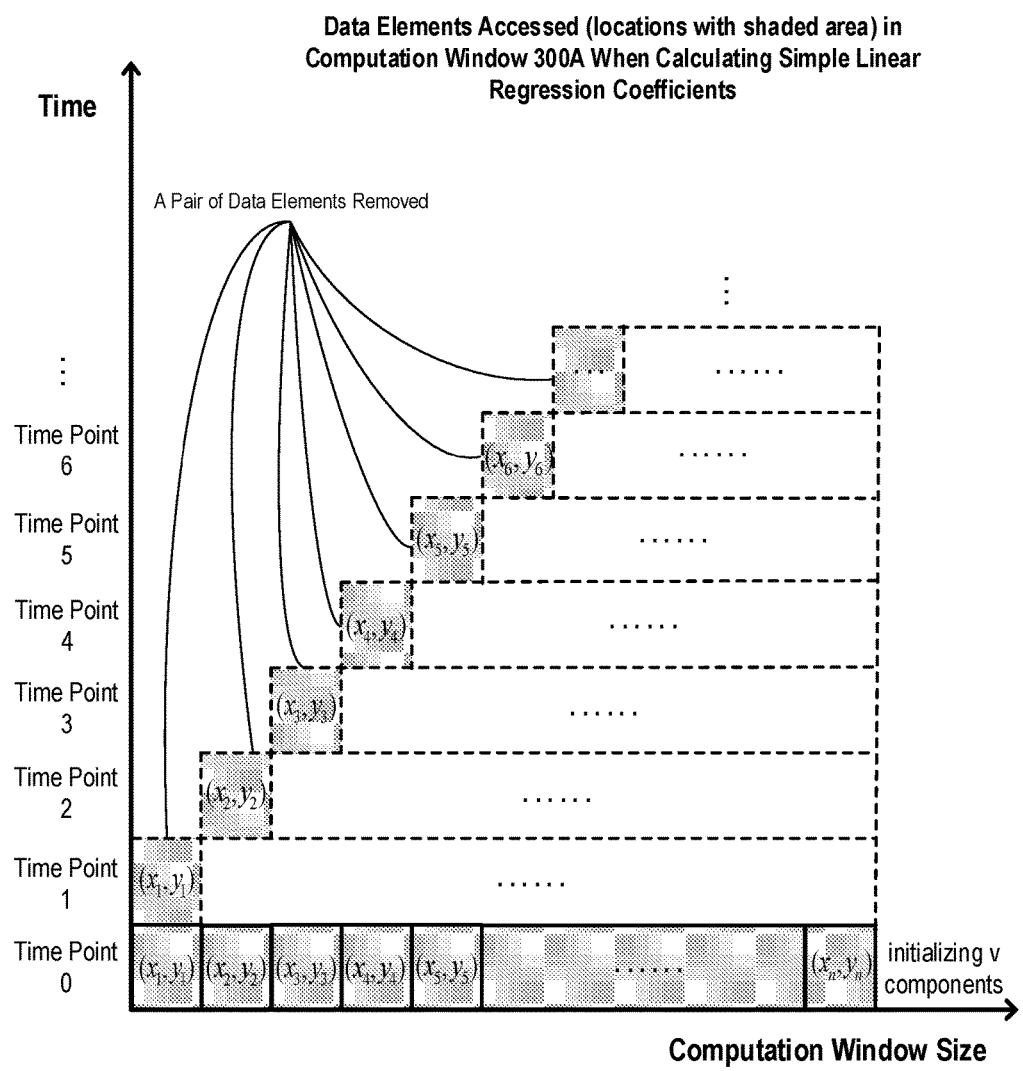
FIG. 3A illustrates data elements that are accessed from one of the two computation windows for decrementally calculating simple linear regression coefficients on streamed data.

FIG. 3A illustrates data elements that are accessed from a computation window 300A for decrementally calculating simple linear regression coefficients on streamed data. Computation window 300A should be non-empty where v components have already been calculated or initialized. The difference between a computation window and a computation set is that the pairs of data elements in a computation window are ordered (e.g., a pair of data elements is always removed from either the left end or the right end of a computation window). For example, referring to FIG. 3A, an existing pair of data elements is always removed from the left end of computation window 300A. As time progresses, an existing pair of data elements, for example, data element $(x_1, y_1)$, then $(x_2, y_2)$, then $(x_3, y_3)$, . . . is removed from the computation window and accessed respectively for directly decrementally calculating v components of simple linear regression coefficients for the modified computation set, indirectly decrementally calculating w=p−v components, and calculating the simple linear regression coefficients using one or more decrementally calculated components. The v components may be directly decrementally calculated using the removed pair of data elements and the v components for the prior computation window, and other data elements in computation window 300A are not touched. For a given decremental algorithm, v is a constant, so the number of operations for directly decrementally calculating v components is a constant, and the number of operations for indirectly decrementally calculating w=p−v components is also a constant. So, the computation workload for calculating all p components for a given computation window with size n is reduced. Simple linear regression coefficients may then be calculated using one or more decrementally calculated components, thus the overall computation workload is reduced. The larger the n, the more substantial the reduction in computation workload.

Figure 3B:
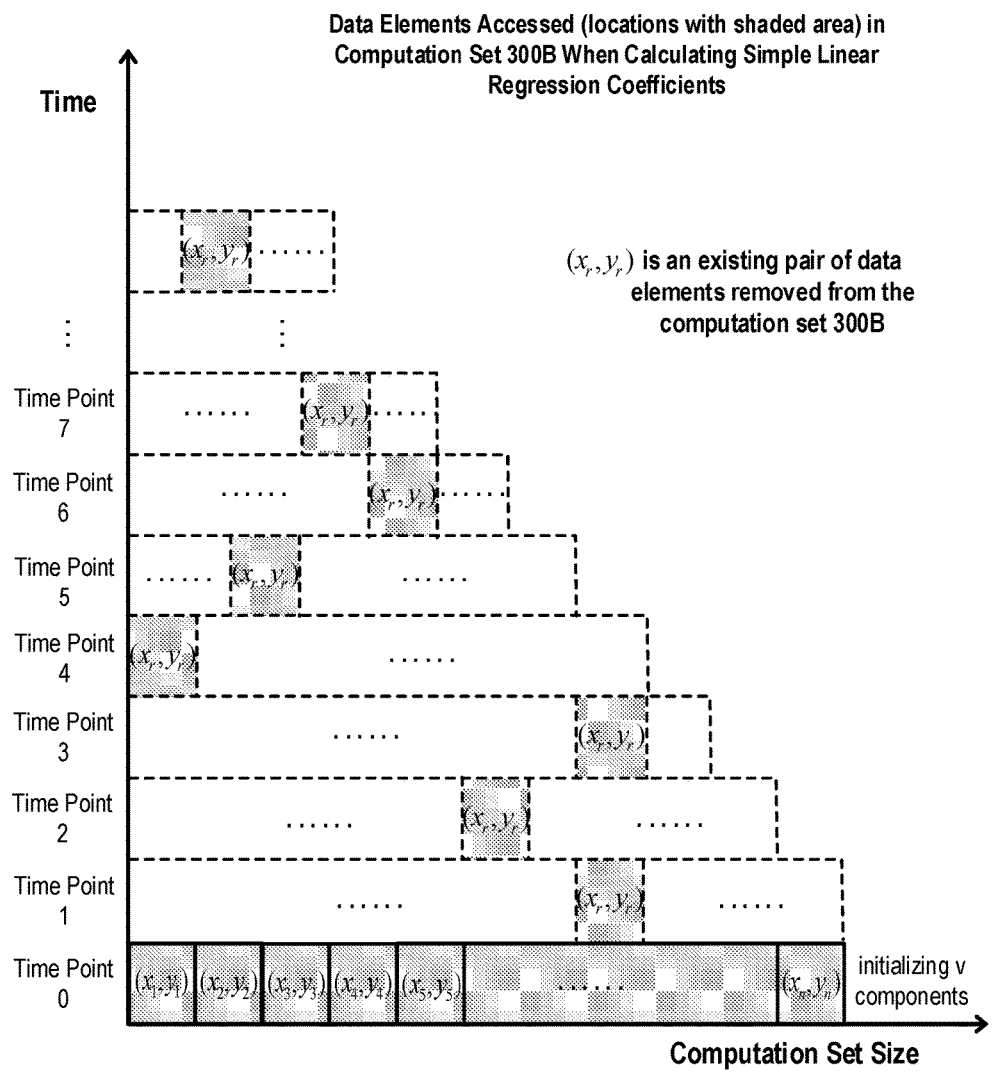
FIG. 3B illustrates data elements that are accessed from one of the computation set for decrementally calculating simple linear regression coefficients on Big Data.

FIG. 3B illustrates data elements that are accessed from a computation set 300B for decrementally calculating simple linear regression coefficients on Big Data. Computation set 300B should be non-empty where v components have already been calculated or initialized. The difference between a computation set and a computation window is that the pairs of data elements in a computation set are not ordered (e.g., a pair of data elements may be removed from any position within a computation set). For example, referring to FIG. 3B, an existing pair of data elements may be removed from any position of computation set 300B. As time progresses, an existing pair of data elements in computation set 300B, for example, data element $(x_r, y_r)$ at the position indicated by shaded area is removed from the computation set and accessed for directly decrementally calculating v components of simple linear regression coefficients for the modified computation set, indirectly decrementally calculating w=p−v components, and calculating the simple linear regression coefficients using one or more decrementally calculated components. The v components may be directly decrementally calculated using the removed pair of data elements and the v components for the previous computation set, and other data elements in computation set 300B are not touched. For a given decremental algorithm, v is a constant, so the number of operations for directly decrementally calculating v components is a constant, and the number of operations for indirectly decrementally calculating w=p−v components is also a constant. So, the computation workload for calculating all p components for a given computation set with size n is reduced. Simple linear regression coefficients may then be calculated using one or more decrementally calculated components, thus the overall computation workload is reduced. The larger the n, the more substantial the reduction in computation workload.

A few examples of components of simple linear regression coefficients and example decremental simple linear regression coefficient calculation algorithms may be found in the following sections.

FIG. 4A illustrates the definition of simple linear regression coefficients. Suppose a computation set XY={$(x_i, y_i)$|i=1, . . . , n} contains the data elements to be involved in simple linear regression coefficient calculation, where data elements $x_1, x_2, x_3, x_4, \ldots, x_n$ are observed data from a predictor variable X and data elements $y_1, y_2, y_3, y_4, \ldots y_n$ are observed data from a response variable Y, simple linear regression coefficients need to be calculated. Equation 401 is a definition equation for simple linear regression coefficient $b1$. Equation 402 is a definition equation for simple linear regression coefficient $b0$. Equation 403 is a traditional equation for calculating a sum $XS_k$ of all the data elements of X variable in computation set XY in the $k^{th}$ iteration. Equation 404 is a traditional equation for calculating a sum $YS_k$ of all the data elements of Y variable in computation set XY in the $k^{th}$ iteration. Equation 405 is a traditional equation for calculating a mean 0.4 of all the data elements of X variable in computation set XY in the $k^{th}$ iteration. Equation 406 is a traditional equation for calculating a mean $\bar{y}_k$ of all the data elements of Y variable in computation set XY in the $k^{th}$ iteration. Equation 407 is a traditional equation for calculating simple linear regression coefficient $b1_k$ for computation set XY in the $k^{th}$ iteration. Equation 408 is a traditional equation for calculating simple linear regression coefficient $b0_k$ for computation set XY in the $k^{th}$ iteration.

Assuming computation set XY of size n is changed with a pair of data elements $(x_r, y_r)$ being removed. Whenever a pair of data elements is removed, the computation set is considered as a modified computation set. The size of modified computation set XY becomes n−1. A new iteration of calculation is started each time any component of simple linear regression coefficients are recalculated due to a data change in the computation set. The iteration becomes $k+1^{th}$ iteration. Equation 409 may be used for calculating a sum $XS_{k+1}$ of all the data elements of X variable in modified computation set XY in the $k+1^{th}$ iteration. Equation 410 may be used for calculating a sum $YS_{k+1}$ of all the data elements of Y variable in modified computation set XY in the $k+1^{th}$ iteration. Equation 411 may be used for calculating a mean $\bar{x}_{k+1}$ of all the data elements of X variable in modified computation set XY in the $k+1^{th}$ iteration. Equation 412 may be used for calculating a mean $y_{k+1}$ of all the data elements of Y variable in modified computation set XY in the $k+1^{th}$ iteration. Equation 413 may be used for calculating a simple linear regression coefficient $b1_{k+1}$ for the modified computation set XY in the $k+1^{th}$ iteration. Equation 414 may be used for calculating a simple linear regression coefficient $b0_{k+1}$ for the modified computation set XY in the $k+1^{th}$ iteration.

FIG. 4B illustrates some components of simple linear regression coefficients and basic decremental component calculation equations. A component of simple linear regression coefficients is a quantity or expression appearing in the simple linear regression coefficients' definition equations or any transforms of the definition equations. The following are a few example components of simple linear regression coefficients.

$$XS_k = \sum_1^n x_i$$

$$YS_k = \sum_1^n y_i$$

$$\bar{x}_k = \frac{XS_k}{n} = \frac{1}{n}\sum_1^n x_i$$

$$\bar{y}_k = \frac{YS_k}{n} = \frac{1}{n}\sum_1^n y_i$$

$$XSS_k = \sum_1^n x_i^2$$

$$XV_k = \sum_1^n x_i^2 - n\bar{x}_k^2 = XSS_k - \frac{XS_k^2}{n} = XSS_k - n\bar{x}_k^2$$

$$SSDX_k = \sum_1^n \left(x_i - \frac{XS_k}{n}\right)^2 = \sum_1^n (x_i - \bar{x}_k)^2$$

$$SDXY_k = \sum_1^n (x_i - \bar{x}_k)(y_i - \bar{y}_k) = \sum_1^n \left(x_i - \frac{XS_k}{n}\right)(y_i - \bar{y}_k) = \sum_1^n (x_i - \bar{x}_k)\left(y_i - \frac{YS_k}{n}\right) = \sum_1^n \left(x_i - \frac{XS_k}{n}\right)\left(y_i - \frac{YS_k}{n}\right)$$

$$SXY_k = \sum_1^n x_i y_i$$

$$x\sigma_k^2 = \frac{\sum_1^n x_i^2}{n} - \bar{x}_k^2 = \frac{\sum_1^n x_i^2}{n} - \left(\frac{XS_k}{n}\right)^2$$

$$b1_k = \frac{\sum_1^n (x_i - \bar{x}_k)(y_i - \bar{y}_k)}{\sum_1^n (x_i - \bar{x}_k)^2} = \frac{\sum_1^n \left(x_i - \frac{XS_k}{n}\right)(y_i - \bar{y}_k)}{\sum_1^n \left(x_i - \frac{XS_k}{n}\right)^2} =$$

$$\frac{\sum_1^n (x_i - \bar{x}_k)\left(y_i - \frac{YS_k}{n}\right)}{\sum_1^n (x_i - \bar{x}_k)^2} = \frac{\sum_1^n \left(x_i - \frac{XS_k}{n}\right)\left(y_i - \frac{YS_k}{n}\right)}{\sum_1^n \left(x_i - \frac{XS_k}{n}\right)^2}$$

$$b0_k = \frac{YS_k}{n} - b1_k \frac{XS_k}{n} = \frac{YS_k}{n} - b1_k \bar{x}_k = \bar{y}_k - b1_k \frac{XS_k}{n} = \bar{y}_k - b1_k \bar{x}_k$$

There are two simple linear regression coefficients $b1_k$ and $b0_k$. Since $b1_k$ appears in $b0_k$'s definition equation, $b1_k$ is a component of $b0_k$, and all $b1_k$'s components are also $b0_k$'s components. Component $b0_k$'s components $\bar{x}_k$ and $\bar{y}_k$ also appear in $b1_k$'s definition equation, so $\bar{x}_k$ and $\bar{y}_k$ are also $b0_k$'s components. Thus, simple linear regression coefficients $b1_k$ and $b0_k$ may be considered to share some common components. $SDXY_k$, $SSDX_k$, $\bar{x}_k$, and $\bar{y}_k$ are components of simple linear regression coefficients because they directly appear in the definition of simple linear regression coefficients. $SXY_k$, $XSS_k$, and $XV_k$ are also components of simple linear regression coefficients because they appear in a transform expression of simple linear regression coefficients' definition. Even simple linear regression $$b1_k = \frac{\sum_1^n (x_i - \bar{x}_k)(y_i - \bar{y}_k)}{\sum_1^n (x_i - \bar{x}_k)^2}$$

itself is considered as a component because it is the largest component appearing in the definition of simple linear regression coefficient $b1_k$. Similarly, $b0_k$ is also the largest component of $b0_k$ itself. Simple linear regression coefficients may be calculated based on one or more components or combinations of them. For example, if $$SDXY_k = \sum_1^n (x_i - \bar{x}_k)(y_i - \bar{y}_k) \text{ and } SSDX_k = \sum_1^n (x_i - \bar{x}_k)^2$$

are known, simple linear regression coefficient $b1_k$ may be calculated, and coefficient $b0_k$ may then be calculated too. If all required components may be decrementally calculated, then simple linear regression coefficients may be decrementally calculated. The number of components to be used varies depending on a specific decremental simple linear regression coefficient calculation algorithm used. Since multiple components of simple linear regression coefficients and even more combinations of the components exist, there are multiple algorithms supporting decremental simple linear regression coefficient calculations. To illustrate how to use components to decrementally calculate simple linear regression coefficients, three different decremental simple linear regression coefficient calculation algorithms are presented as examples in the following sections. A new iteration of calculation is started each time any component of simple linear regression coefficients are recalculated due to a data change in the computation set which causes a computation set to change to a modified computation set. A sum or a mean is the basic component to be used for calculating simple linear regression coefficients. Equation 415 may be used for directly decrementally calculating a sum $XS_{k+1}$ of all the data elements of X variable in the modified computation set XY in the $k+1^{th}$ iteration. Equation 416 may be used for directly decrementally calculating a sum $YS_{k+1}$ of all the data elements of Y variable in the modified computation set XY in the $k+1^{th}$ iteration. Equation 417 may be used for directly decrementally calculating a mean $\bar{y}_{+1}$ of all the data elements of X variable in the modified computation set XY in the $k+1^{th}$ iteration. Equation 414 may be used for directly decrementally calculating a mean $\bar{y}_{k+1}$ of all the data elements of Y variable in the modified computation set XY in the $k+1^{th}$ iteration. Either a sum $XS_{k+1}$ or a mean $\bar{x}_{k+1}$ and either a sum $YS_{k+1}$ or a mean $\bar{y}_{k+1}$ will be used in all three example decremental simple linear regression coefficient calculation algorithms described below.

FIG. 4C illustrates the first example decremental simple linear regression coefficient calculation algorithm (decremental algorithm 1) for decrementally calculating simple linear regression coefficients. Equation 415 may be used for directly decrementally calculating a sum $XS_{k+1}$ of X variable in modified computation set XY in the $k+1^{th}$ iteration. Equation 416 may be used for directly decrementally calculating a sum $YS_{k+1}$ of Y variable in modified computation set XY in the $k+1^{th}$ iteration. Equation 417 may be used for directly decrementally calculating a mean $\bar{x}_{k+1}$ of X variable in modified computation set XY in the $k+1^{th}$ iteration. Equation 418 may be used for directly decrementally calculating a mean $\bar{y}_{k+1}$ of Y variable in modified computation set XY in the $k+1^{th}$ iteration. Components $XS_{k+1}$ or $\bar{x}_{k+1}$ and $YS_{k+1}$ or $\bar{y}_{k+1}$ are directly decrementally calculated. Equation 419 is a traditional equation for calculating component $XSS_k$ in computation set XY in the $k^{th}$ iteration. Equation 420 is a traditional equation for calculating component $XSS_{k+1}$ in modified computation set XY in the $k+1^{th}$ iteration. Equation 421 may be used for directly decrementally calculating component $XSS_{k+1}$ in modified computation set XY in the $k+1^{th}$ iteration if component $XSS_k$ is available.

Equations 422 may be used for calculating component $XV_k$ in computation set XY in the $k^{th}$ iteration if components $XSS_k$, $XS_k$ or $\bar{x}_k$ are available. Equations 422 comprise multiple equations but only one is needed depending on whether a sum or a mean is available. Equations 423 may be used for indirectly decrementally calculating component $XV_{k+1}$ in modified computation set XY in the $k+1^{th}$ iteration if components $XSS_{k+1}$, $XS_{k+1}$ or $\bar{x}_{k+1}$ are available. Equations 423 comprise multiple equations but only one is needed depending on whether a sum or a mean is available. Equation 424 is a traditional equation for calculating component $SXY_k$ in the $k^{th}$ iteration. Equation 425 is a traditional equation for calculating component $SXY_{k+1}$ in the $k+1^{th}$ iteration. Equation 426 may be used for directly decrementally calculating component $SXY_{k+1}$ in the $k+1^{th}$ iteration if component $SXY_k$ is available. Equations 427 may be used for indirectly decrementally calculating simple linear regression coefficient $b1_{k+1}$ if components $XS_{k+1}$ or $\bar{x}_{k+1}$, $YS_{k+1}$ or $\bar{y}_{k+1}$, $SXY_{k+1}$, and $XV_{k+1}$ are available. Equations 427 comprise multiple equations but only one is needed depending on whether a sum or a mean or both are available. Equations 428 may be used for indirectly decrementally calculating simple linear regression coefficient $b0_{k+1}$ if components $XS_{k+1}$ or $\bar{x}_{k+1}$, $YS_{k+1}$ or $\bar{y}_{k+1}$, and $b1_{k+1}$ are available. Equations 428 comprise multiple equations but only one is needed depending on whether a sum or a mean or both are available.

FIG. 4D illustrates the second example decremental simple linear regression coefficient calculation algorithm (decremental algorithm 2) for decrementally calculating simple linear regression coefficients. Equation 415 may be used for directly decrementally calculating a sum $XS_{k+1}$ of X variable in modified computation set XY in the $k+1^{th}$ iteration. Equation 416 may be used for directly decrementally calculating a sum $YS_{k+1}$ of Y variable in modified computation set XY in the $k+1^{th}$ iteration. Equation 417 may be used for directly decrementally calculating a mean $\bar{x}_{+1}$ of X variable in modified computation set XY in the $k+1^{th}$ iteration. Equation 418 may be used for directly decrementally calculating a mean $y_{k+1}$ of Y variable in modified computation set XY in the $k+1^{th}$ iteration. Components $XS_{k+1}$ or $\bar{x}_{k+1}$ and $YS_{k+1}$ or $\bar{y}_{k+1}$ are directly decrementally calculated. Equation 429 is a traditional equation for calculating component $SSDX_k$ in computation set XY in the $k^{th}$ iteration. Equation 430 is a traditional equation for calculating component $SSDX_{k+1}$ in modified computation set XY in the $k+1^{th}$ iteration. Equations 431 may be used for directly decrementally calculating component $SSDX_{k+1}$ in modified computation set XY in the $k+1^{th}$ iteration if components $XS_k$ or $x_k$ and $XS_{k+1}$ or $\bar{x}_{k+1}$ and $SSDX_k$ are available. Equations 431 comprise multiple equations but only one is needed depending on whether a sum or a mean is available. Equation 432 is a traditional equation for calculating component $SDXY_k$ in computation set XY in the $k^{th}$ iteration. Equation 433 is a traditional equation for calculating component $SDXY_{k+1}$ in modified computation set XY in the $k+1^{th}$ iteration. Equations 434 may be used for directly decrementally calculating component $SDXY_{k+1}$ in modified computation set XY in the $k+1^{th}$ iteration if components $SDXY_k$, $YS_k$ or $\bar{y}_k$ and $YS_{k+1}$ or $\bar{y}_{k+1}$ are available. Equations 434 comprise multiple equations but only one is needed depending on whether a sum or a mean is available. Equation 435 may be used for indirectly decrementally calculating simple linear regression coefficient $b1_{k+1}$ in the $k+1^{th}$ iteration if components $SDXY_{k+1}$ and $SSDX_{k+1}$ are available. Equations 436 may be used for indirectly decrementally calculating simple linear regression coefficient $b0_{k+1}$ in the $k+1^{th}$ iteration if components $XS_{k+1}$ or $\bar{x}_{k+1}$, $YS_{k+1}$ or $\bar{y}_{k+1}$, and $b1_{k+1}$ are available. Equations 436 comprise multiple equations but only one is needed depending on whether a sum or a mean or both are available.

FIG. 4E illustrates the third example decremental simple linear regression coefficient calculation algorithm (decremental algorithm 3) for decrementally calculating simple linear regression coefficients. Equation 415 may be used for directly decrementally calculating a sum $XS_{k+1}$ of X variable in modified computation set XY in the $k+1^{th}$ iteration. Equation 416 may be used for directly decrementally calculating a sum $YS_{k+1}$ of Y variable in modified computation set XY in the $k+1^{th}$ iteration. Equation 417 may be used for directly decrementally calculating a mean $\bar{x}_{k+1}$ of X variable in modified computation set XY in the $k+1^{th}$ iteration. Equation 418 may be used for directly decrementally calculating a mean $\bar{y}_{k+1}$ of Y variable in modified computation set XY in the $k+1^{th}$ iteration. Components $XS_{k+1}$ or $\bar{x}_{k+1}$ and $YS_{k+1}$ or $\bar{y}_{k+1}$ are directly decrementally calculated. Equation 437 is a traditional equation for calculating component $XSS_k$ in computation set XY in the $k^{th}$ iteration. Equation 438 is a traditional equation for calculating component $XSS_{k+1}$ in the $k+1^{th}$ iteration. Equation 439 may be used for directly decrementally calculating component $XSS_{k+1}$ in the $k+1^{th}$ iteration if component $XSS_k$ is available. Equation 440 is a traditional equation for calculating component $SXY_k$ in computation set XY in the $k^{th}$ iteration. Equation 441 is a traditional equation for calculating component $SXY_{k+1}$ in the $k+1^{th}$ iteration. Equation 442 may be used for directly decrementally calculating component $SXY_{k+1}$ in the $k+1^{th}$ iteration if component $SXY_k$ is available. Equations 443 may be used for indirectly decrementally calculating simple linear regression coefficient $b1_{k+1}$ in the $k+1^t$ iteration if components $XS_{k+1}$ or $\bar{x}_{k+1}$, $YS_{k+1}$ or $\bar{y}_{k+1}$, $XSS_{k+1}$, and $SXY_{k+1}$ are available. Equations 443 comprise multiple equations but only one is needed depending on whether a sum or a mean or both are available. Equation 444 may be used for indirectly decrementally calculating simple linear regression coefficient $b0_{k+1}$ in the $k+1^{th}$ iteration if components $XS_{k+1}$ or $\bar{x}_{k+1}$, $YS_{k+1}$ or $\bar{y}_{k+1}$, and $b1_{k+1}$ are available. Equations 444 comprise multiple equations but only one is needed depending on whether a sum or a mean or both are available.

To demonstrate decremental simple linear regression coefficient calculation algorithms and their comparison against traditional algorithms, three examples are given below. Three computation sets of data elements are used. For traditional algorithms, the calculations for all three computation sets are exactly the same. For decremental algorithms, initialization of one or more components is performed for the first computation set, and decremental calculations are performed for the second and third computation sets.

FIG. 5A illustrates an example of calculating simple linear regression coefficients on XY Big Data Set 501 using traditional algorithms. XY Big Data Set 501 is either a Big Data set or streamed data. XY computation set 502 includes 6 pairs of data elements from XY Big Data Set 501. XY computation set size 503 ($n$) is 6. Equation 405 may be used for calculating $\bar{x}_1$ and equation 406 may be used for calculating $\bar{y}_1$. Then, $\Sigma_1^6 (x_i-\bar{x}_1)(y_i-\bar{y}_1)$, $\Sigma_1^6(x_i-\bar{x}_1)^2$ and $\Sigma_1^6 (y_i-\bar{y}_1)^2$ are calculated respectively. Finally, Equation 407 may be used for calculating simple linear regression coefficient $b1_1$ and equation 408 may be used for calculating simple linear regression coefficient $b0_1$. There are a total of 3 divisions, 13 multiplications, 20 additions and 19 subtractions when calculating the simple linear regression coefficients on 6 pairs of data elements without any optimization.

The same equations may be used to calculate the simple linear regression coefficients for XY computation set 504 as shown in FIG. 5A Cont'd 1. However XY computation set size 505 is decreased to 5. Since the size of XY computation set is decreased by 1 compared to that of the previous XY computation set, the total number of operations is decreased accordingly. The calculation includes a total of 3 divisions, 11 multiplications, 16 additions, and 16 subtractions when calculating the simple linear regression coefficients on 5 pairs of data elements without any optimization.

The same equations may be used to calculate the simple linear regression coefficients for XY computation set 506 as shown in FIG. 5A Cont'd 2. XY computation set size 507 is decreased to 4. Since the size of XY computation set is decreased by 1 compared to that of the previous XY computation set, the total number of operations is decreased accordingly. The calculation includes a total of 3 divisions, 9 multiplications, 12 additions, and 13 subtractions when calculating the simple linear regression coefficients on 4 pairs of data elements without any optimization. Traditional algorithms for calculating simple linear regression coefficients on n pairs of data elements typically take 3 divisions, 2n+1 multiplications, 4(n−1) additions, and 3n+1 subtractions without any optimization.

FIG. 5B illustrates an example of calculating simple linear regression coefficients using decremental algorithm 1. A mean instead of a sum is used in this example. The calculations for XY computation set 502 use traditional equations for calculating the initial values of components $\bar{x}_1$, $\bar{y}_1$ $XSS_1$, $XV_1$ and $SXY_1$. In practice, such calculation will not happen, because decremental simple linear regression coefficient calculation would start when computation set XY is non-empty and those components have already been calculated. Using traditional algorithms to calculate those components on non-empty computation set XY here are only for the purpose of illustrating the decremental simple linear regression coefficient calculation algorithm. The simple linear regression coefficients for XY computation set 502 are then calculated based on those components. There is a total of 3 divisions, 17 multiplications, 20 additions and 3 subtractions when calculating the simple linear regression coefficients on 6 pairs of data elements without any optimizations.

However, starting from XY computation set 504, the components of the simple linear regression coefficients may be decrementally calculated. XY computation set size 505 is decreased to 5. Equations 417 may be used for directly decrementally calculating mean $\bar{x}_2$ and equation 418 may be used for directly decrementally calculating mean $\bar{y}_2$. Equation 421 may be used for directly decrementally calculating component $XSS_2$ based on component $XSS_1$ previously calculated and removing any contribution of the removed pair of data element $(x_r, y_r)$ mathematically. Equation 423 may be used for indirectly decrementally calculating component $XV_2$ based on component $XSS_2$ and $\bar{x}_2$. Equation 426 may be used for directly decrementally calculating component $SXY_2$ based on previously calculated component $SXY_1$ and removing any contribution of the removed pair of data elements $(x_r, y_r)$ mathematically. Finally, equation 427 may be used for calculating simple linear regression coefficient $b1_2$ based on components $SXY_2$, $XV_2$, $\bar{x}_2$ and $\bar{y}_2$, and equation 428 may be used for calculating simple linear regression coefficient $b0_2$ based on components $b1_2$, $\bar{x}_2$ and $\bar{y}_2$. The operations include a total of 3 divisions, 9 multiplications, and 8 subtractions for decrementally calculating the simple linear regression coefficients.

The same equations may also be used for decrementally calculating the components of simple linear regression coefficients for XY computation set 506 from the components of simple linear regression coefficients for XY computation set 506. XY computation set size 507 is decreased to 4. Although the computation set size is changed, the number of operations performed by the decremental simple linear regression coefficient calculation algorithm remains constant. There are still 3 divisions, 9 multiplications, and 8 subtractions when decrementally calculating the components of simple linear regression coefficients and the simple linear regression coefficients. As such, the number of operations used when decrementally calculating the simple linear regression coefficients is (potentially substantially) less than when using traditional equations.

FIG. 5C illustrates an example of calculating simple linear regression coefficients using decremental algorithm 2. A mean instead of a sum is used in this example. The calculations for XY computation set 502 use traditional equations for calculating the initial values of components $\bar{x}_1$, $\bar{y}_1$ SSDX$_1$, and SDXY$_1$ then use SDXY$_1$, SSDX$_1$ and SSDY$_1$ for calculating simple linear regression coefficients b1$_1$ and b0$_1$. For example, equation 405 may be used for calculating mean $\bar{x}_1$ of X computation set. Equation 406 may be used for calculating mean $\bar{y}_1$ of Y computation set. Equation 429 may be used for calculating SSDX$_1$. Equation 432 may be used for calculating SDXY$_1$. Equation 435 may be used for calculating simple linear regression coefficient b1$_1$ and equation 436 may be used for calculating simple linear regression coefficient b0$_1$ based on components SDXY$_1$, SSDX$_1$ and SSDY$_1$. The total operations include 3 divisions, 13 multiplications, 20 additions, and 19 subtractions for calculating the simple linear regression coefficients on 6 pairs of data elements without any optimization.

However, starting from XY computation set 504, the components of the simple linear regression coefficients may be decrementally calculated. XY computation set size 505 is decreased to 5. Equations 417 may be used for directly decrementally calculating mean $\bar{x}_2$ and equation 418 may be used for directly decrementally calculating mean $\bar{y}_2$. Equation 431 may be used for directly decrementally calculating component SSDX$_2$ based on components SSDX$_1$, $\bar{x}_2$ and $\bar{x}_1$ previously calculated and removing any contribution of the removed pair of data elements ($x_r$, $y_r$) mathematically. Equation 434 may be used for decrementally calculating component SDXY$_2$ based on components SDXY$_1$, $\bar{x}_1$ and $\bar{y}_1$ previously calculated and removing any contribution of the removed pair of data elements ($x_r$, $y_r$) mathematically. Equations 435 and 436 may be used for calculating simple linear regression coefficients b1$_2$ and b0$_2$ respectively based on components SDXY$_2$, SSDX$_2$ and SSDY$_2$. The total operations include 4 divisions, 6 multiplications, and 10 subtractions for calculating the decremental simple linear regression coefficients.

The same equations may also be used for decrementally calculating the components of simple linear regression coefficients for XY computation set 506 from the components of simple linear regression coefficients. XY computation set size 507 is decreased to 4. Although the computation set size is changed, the number of operations performed by the decremental simple linear regression coefficient calculation algorithm remains constant. There are still 4 divisions, 6 multiplications, and 10 subtractions when decrementally calculating the components of simple linear regression coefficients and the simple linear regression coefficients. As such, the number of operations used when decrementally calculating the simple linear regression coefficients is (potentially substantially) less than when using traditional equations.

FIG. 5D illustrates an example of calculating simple linear regression coefficients using decremental algorithm 3. A mean instead of a sum is used in this example. The calculations for XY computation set 502 use traditional equations for calculating the initial values of components $\bar{x}_1$, $\bar{y}_1$, XSS$_1$, and SXY$_1$ and then use these components for calculating simple linear regression coefficients b1$_1$ and b0$_1$. For example, equation 405 may be used for calculating mean $\bar{x}_1$ of X variable in the XY computation set 502. Equation 406 may be used for calculating mean $\bar{y}_1$ of Y variable in the XY computation set 502. Equation 437 may be used for calculating XSS$_1$. Equation 440 may be used for calculating SXY$_1$. Finally, equations 443 and 444 may be used for calculating simple linear regression coefficients b1$_1$ and b0$_1$ respectively based on components SXY$_1$, $\bar{x}_1$, $\bar{y}_1$, and XSS$_1$. The total operations include 3 divisions, 16 multiplications, 20 additions, and 3 subtractions for calculating the simple linear regression coefficients on 6 pairs of data elements without any optimization.

However, starting from XY computation set 504, the components of the simple linear regression coefficients may be decrementally calculated. XY computation set size 505 is decreased to 5. Equations 417 may be used for directly decrementally calculating mean $\bar{x}_2$ and equation 418 may be used for directly decrementally calculating mean $\bar{y}_2$. Equation 439 may be used for decrementally calculating component XSS$_2$ based on components XSS$_1$ previously calculated and removing any contribution of the removed pair of data elements ($x_r$, $y_r$) mathematically. Equation 442 may be used for decrementally calculating component SXY$_2$ based on components SXY$_1$ previously calculated and removing any contribution of the removed pair of data elements ($x_r$, $y_r$) mathematically. Equations 443 and 444 may be used for calculating simple linear regression coefficients b1$_2$ and b0$_2$ respectively based on components SXY$_2$, $\bar{x}_2$, $\bar{y}_2$, and XSS$_2$. The operations include a total of 3 divisions, 9 multiplications, and 8 subtractions for calculating the decremental simple linear regression coefficients.

The same equations may also be used for decrementally calculating the components of simple linear regression coefficients for XY computation set 506 from the components of simple linear regression coefficients. XY computation set size 507 is decreased to 4. Although the computation set size is changed, the number of operations performed by the decremental simple linear regression coefficient calculation algorithm remains constant. There are still 3 divisions, 9 multiplications, and 8 subtractions when decrementally calculating the components of simple linear regression coefficients and the simple linear regression coefficients. As such, the number of operations used when decrementally calculating the simple linear regression coefficients is (potentially substantially) less than when using traditional equations.

FIG. 6 illustrates computational loads for traditional algorithms and decremental algorithms for n=4. As depicted, there are fewer multiplication operations, fewer addition operations, or fewer subtraction operations using any one of the decremental algorithms compared to traditional algorithms.

FIG. 7 illustrates computational loads for traditional algorithms and decremental algorithms for n=1,000,000. As depicted, there are substantially fewer multiplication operations, fewer addition operations, and fewer subtraction operations using any one of the decremental algorithms compared to traditional algorithms.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed:

1. A computing-system-implemented method for calculating simple linear regression coefficients for data elements in a modified computation set, the method comprising:
    initializing, by a computing-device-based computing system comprising one or more computing devices and one or more storage media, each of the computing devices comprising one or more processors, a computation set size counter $n(n \geq 6)$, a sum or a mean or both for each variable, and one or more other components of simple linear regression coefficients for a pre-modified computation set, wherein the pre-modified computation set contains n pairs of data elements of one or two data sets on the one or more storage media or one or two data streams;
    accessing or receiving, by the computing-device-based computing system, a pair of data elements to be removed from the pre-modified computation set;
    modifying, by the computing-device-based computing system, the pre-modified computation set by:
        removing the accessed or received pair of data elements from the pre-modified computation set; and
        modifying the computation set size counter;
    decrementally deriving, by the computing-device-based computing system, a sum or a mean or both for each variable in the modified computation set,
    directly decrementally deriving, by the computing-device-based computing system and based at least in part on the one or more components of simple linear regression coefficients other than a sum and a mean for the pre-modified computation set, one or more components of simple linear regression coefficients other than a sum and a mean for the modified computation set, wherein the decrementally deriving includes:
        accessing the one or more components of simple linear regression coefficients other than a sum and a mean initialized or derived for the pre-modified computation set without accessing all data elements in the modified computation set to reduce data accessing latency thereby saving computing resources and reducing the computing-device-based computing system's power consumption; and
        removing any contribution of the removed pair of data elements from each of the accessed components mathematically without using all data elements in the modified computation set thereby increasing calculation efficiency; and
    generating, by the computing-device-based computing system, simple linear regression coefficients for the modified computation set based on one or more of the decrementally derived components.

2. The computing-system-implemented method of claim 1, wherein the generating simple linear regression coefficients further comprises indirectly decrementally deriving, by the computing-device-based computing system, one or more components of simple linear regression coefficients for the modified computation set, wherein the indirectly decrementally deriving the one or more components includes individually calculating each respective one of the one or more components based on one or more components other than the respective one component.

3. The computing-system-implemented method of claim 1, wherein the accessing or receiving a pair of data elements to be removed from the pre-modified computation set includes accessing or receiving a plurality of $z(z>1)$ pairs of data elements to be removed from the pre-modified computation set, and wherein the method further comprises performing, for each pair of the respective z pairs of data elements to be removed, the modifying the pre-modified computation set, the decrementally deriving a sum or a mean or both for each variable, the directly decrementally deriving the one or more components for the modified computation set, and the generating simple linear regression coefficients for the modified computation set.

4. The computing-system-implemented method of claim 3, wherein the generating simple linear regression coefficients comprises generating simple linear regression coefficients only when the simple linear regression coefficients are accessed.

5. The computing-system-implemented method of claim 4, wherein the generating simple linear regression coefficients further comprises indirectly decrementally deriving, by the computing-device-based computing system, one or more components of the simple linear regression coefficients for the modified computation set, wherein the indirectly decrementally deriving the one or more components includes individually calculating each respective one of the one or more components based on one or more components other than the respective one component.

6. The computing-system-implemented method of claim 1, wherein the accessing or receiving a pair of data elements to be removed from the pre-modified computation set includes accessing or receiving a plurality of $z(z>1)$ pairs of data elements to be removed from the pre-modified computation set, and wherein the method further comprises performing, for each pair of the respective z pairs of data elements to be removed, the modifying of the pre-modified computation set, the decrementally deriving a sum or a mean or both for each variable, and the directly decrementally deriving the one or more components for the modified computation set.

7. A computing system, the computing system comprising:
    one or more processors;
    one or more storage media; and
    one or more calculation modules that, when executed by at least one of the one or more processors, determines simple linear regression coefficients for a modified computation set, wherein the determining simple linear regression coefficients includes to:
    a. initialize a computation set size counter $n(n \geq 6)$, a sum or a mean or both for each variable, and one or more other components of simple linear regression coefficients for a pre-modified computation set, wherein the pre-modified computation set contains n pairs of data elements of one or two data sets on the one or more storage media or one or two data streams;
    b. access or receive a pair of data elements to be removed from the pre-modified computation set;
    c. modify the pre-modified computation set by removing the accessed or received pair of data elements from the pre-modified computation set and modifying the computation set size counter;
    d. decrementally calculate a sum or a mean or both for each variable in the modified computation set, e. directly decrementally calculate one or more components other than a sum and a mean of simple linear regression coefficients for the modified computation set based at least in part on the one or more components other than a sum and a mean for the pre-modified computation set, wherein the direct decremental calculation of the one or more components includes to remove any contribution of the removed pair of data elements from each of the one or more components mathematically without accessing and using all data elements in the modified computation set to reduce data access latency and number of operations performed by the computing system, thereby increasing calculation efficiency, saving computing resources and reducing the computing system's power consumption; and f. generate simple linear regression coefficients for the modified computation set based on one or more of the decrementally calculated components.

8. The computing system of claim 7, wherein the generating simple linear regression coefficients further comprises indirectly decrementally calculating one or more components of simple linear regression coefficients for the modified computation set, wherein the indirectly decrementally calculating one or more components includes individually calculating each respective one of the one or more components based on one or more components other than the respective one component.

9. The computing system of claim 7, wherein the one or more calculation modules, when executed by at least one of the one or more processors, perform b, c, d, e, and f multiple times.

10. The computing system of claim 9, wherein the performing f comprises generating simple linear regression coefficients only when the simple linear regression coefficients are accessed.

11. The computing system of claim 10, wherein the generating simple linear regression coefficients comprises indirectly decrementally calculating one or more components of the simple linear regression coefficients for the modified computation set, wherein the indirectly decrementally calculating one or more components includes individually calculating each respective one of the one or more components based on one or more components other than the respective one component.

12. The computing system of claim 7, wherein the one or more calculation modules, when executed by at least one of the one or more processors, perform b, c, d, and e multiple times.

13. A computing system program product comprising one or more non-transitory computing-device-readable storage media having stored thereon computing-device-executable instructions that, when executed by at least one of one or more computing devices within a configured computing system, cause the configured computing system to perform a method for generating simple linear regression coefficients for data elements in a modified computation set, the method including steps to:

initialize, by a configured computing system comprising one or more computing devices and one or more storage media, each of the computing devices comprising one or more processors, a computation set size counter n(n≥6), a sum or a mean or both for each variable, and one or more other components of simple linear regression coefficients for a pre-modified computation set, wherein the pre-modified computation set contains n pairs of data elements of one or two data sets on the one or more storage media or one or two data streams;

access or receive, by the configured computing system, a pair of data elements to be removed from the pre-modified computation set;

modify, by the configured computing system, the pre-modified computation set via removing the accessed or received pair of data elements from the pre-modified computation set and modifying the computation set size counter;

decrementally calculate, by the configured computing system, a sum or a mean or both for each variable in the modified computation set, directly decrementally calculate, by the configured computing system, one or more components of simple linear regression coefficients other than a sum and a mean for the modified computation set based at least in part on the one or more components of simple linear regression coefficients other than a sum and a mean for the pre-modified computation set, including to:

access the one or more components of simple linear regression coefficients other than a sum and a mean initialized or calculated for the pre-modified computation set without accessing all data elements in the modified computation set to reduce data accessing latency thereby saving computing resources and reducing the configured computing system's power consumption; and remove any contribution of the removed pair of data elements from each of the accessed components mathematically without using all data elements in the modified computation set thereby increasing calculation efficiency; and generate, by the configured computing system, simple linear regression coefficients for the modified computation set based on one or more of the decrementally calculated components.

14. The computing system program product of claim 13, wherein the generating simple linear regression coefficients further comprises to indirectly decrementally calculate, by the configured computing system, one or more components for the modified computation set, wherein the indirectly decrementally calculating the one or more components includes individually calculating each respective one of the one or more components based on one or more components other than the respective one component.

15. The computing system program product of claim 13, wherein the computing-device-executable instructions that, when executed, further cause the configured computing system to access or receive a pair of data elements to be removed, to modify the pre-modified computation set, to decrementally calculate a sum or a mean or both for each variable, to directly decrementally calculate the one or more components other than a sum and a mean, and to generate simple linear regression coefficients for the modified computation set for each of multiple pairs of data elements to be accessed or received.

16. The computing system program product of claim 15, wherein the generating simple linear regression coefficients comprises generating simple linear regression coefficients only when the simple linear regression coefficients are accessed.

17. The computing system program product of claim 16, wherein the generating simple linear regression coefficients comprises indirectly decrementally calculating one or more components of the simple linear regression coefficients for the modified computation set, wherein the indirectly decrementally calculating one or more components includes individually calculating each respective one of the one or more components based on one or more components other than the respective one component.

18. The computing system program product of claim 13, wherein the computing-device-executable instructions that, when executed, further cause the configured computing system to access or receive a pair of data elements to be removed, to modify the pre-modified computation set, to decrementally calculate a sum or a mean or both for each variable, and to directly decrementally calculate the one or more components other than a sum and a mean for the modified computation set for each of multiple pairs of data elements to be accessed or received.

\* \* \* \* \*